INVENTORS
Rowland J. Kopf
Robert W. Henning
BY Roger Marsh

Hyde, Meyer, Baldwin & Doran
ATTORNEYS

INVENTORS
Rowland J. Kopf
Robert W. Henning
BY Roger Marsh

ATTORNEYS

INVENTORS
Rowland J. Kopf
Robert W. Henning
BY Roger Marsh

Hyde, Meyer, Baldwin & Doran
ATTORNEYS

July 19, 1960 R. J. KOPF ET AL 2,945,236
EXPLOSIVELY ACTUATED TOOLS
Filed May 14, 1953 6 Sheets-Sheet 6

INVENTORS
Rowland J. Kopf
Robert W. Henning
BY Roger Marsh
Hyde, Meyer, Baldwin & Doran
ATTORNEYS

2,945,236

EXPLOSIVELY ACTUATED TOOLS

Rowland J. Kopf and Robert W. Henning, Rocky River, and Roger Marsh, Hudson, Ohio, assignors, by mesne assignments, to Olin Mathieson Chemical Corporation, a corporation of Virginia Filed May 14, 1953, Ser. No. 355,034

40 Claims. (Cl. 1—106)

This invention relates to improvements in a fastener driving tool and more particularly to a tool of the powder actuated type.

The object of the present invention is to provide a powder actuated fastener driving tool characterized by its structural simplicity, the economy of its manufacture, ease of assembly of its parts, its operating efficiency, its many safety features, its ease of operation, and its universal construction for use under many different conditions.

Other features of this invention reside in the arrangement and design of the parts for carrying out their appropriate functions. Other objects and advantages of this invention will be apparent from the accompanying drawings and description and the essential features will be set forth in the appended claims.

In the drawings,

Fig. 18 is a vertical, longitudinal section taken through the extension rod and its spring biased release button corresponding to a portion on the left of Fig. 1 but with the extension rod in Fig. 18 having buttress form threads as a modification; while

Before the tool here illustrated is specifically described, it is to be understood that the invention here involved is not limited to the structural details or arrangement of parts here shown since tools embodying the present invention may take various forms. It also is to be understood that the phraseology or terminology herein employed is for purposes of description and not of limitation since the scope of the present invention is denoted by the appended claims.

Those familiar with this art will recognize that the present invention may be applied in many ways, but it has been chosen to illustrate the same as a powder actuated fastener driving tool. Many of the features may be used on other tools, other powder charge actuated devices, and other projectile or fastener firing or driving devices.

Figure 1:
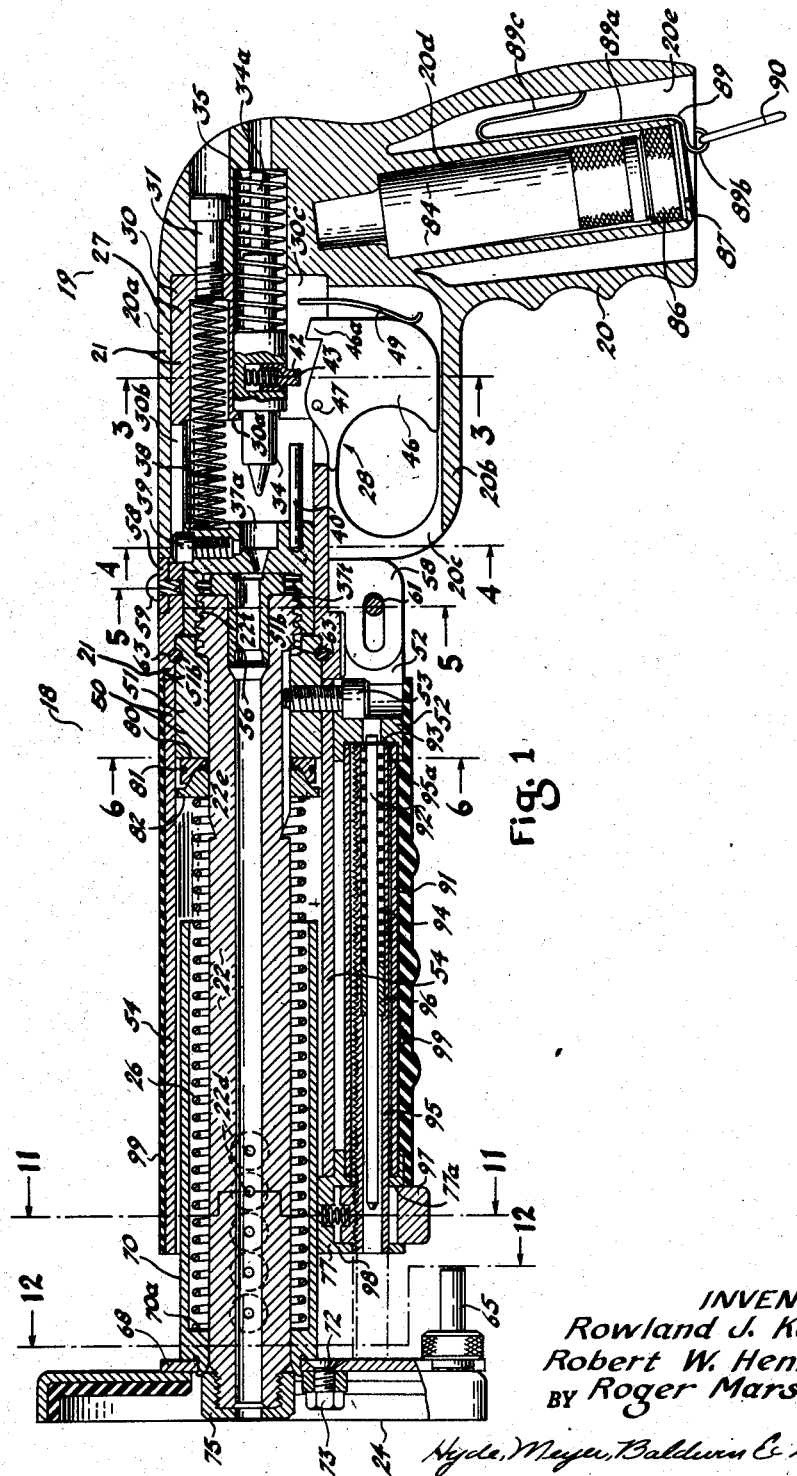
Fig. 1 is a vertical, longitudinal, sectional view of the powder actuated tool in the safety or normal position.

The tool is illustrated in general in Fig. 1. It comprises interconnected pistol grip or handle 20, barrel 22, and a powder charge firing means 28. The tool can be divided into two major parts, the barrel assembly 18 and the breech assembly 19, shown in Fig. 1 generally on the left and right of section line 5—5 respectively and in Fig. 10 on the left and right respectively. The barrel assembly 18 has a barrel 22 with a chamber in its breech for receiving a fastener unit comprising in Fig. 2 a cartridge case 23a with a primer and powder charge and a fastener 23b so that the fastener will be driven through the barrel bore when the primer is struck to explode the power charge. The breech assembly 19 has a powder charge firing means, generally shown at 28 in Fig. 1 and including a firing pin for striking said primer and a trigger for release of the firing pin. The tool has a housing 21 surrounding the barrel 22 and the firing means 28 with the barrel 22 mounted for telescopic endwise or axial movement in and relative to the housing between a normal, muzzle advanced, safety, first position in Fig. 1 and a muzzle depressed, ready-to-fire or firing, second position in Fig. 2. The tool is moved endwise between the first and second positions by pressing the barrel muzzle against the workpiece 25 on the left in Fig. 2 into which the fastener 23b is to be driven and then telescopically moving the tool housing 21 over the barrel 22. It should be noted that the barrel breech and the firing means 28 in the first and second positions are respectively spaced widely apart and adjacent each other while the housing 21 moves endwise in traveling relative to the barrel from the first to the second position. As will be brought out in further detail hereinafter, this endwise movement of the tool housing 21 relative to the barrel from the first to the second position cocks the firing pin for release by the trigger in the firing means 28.

Figure 2:
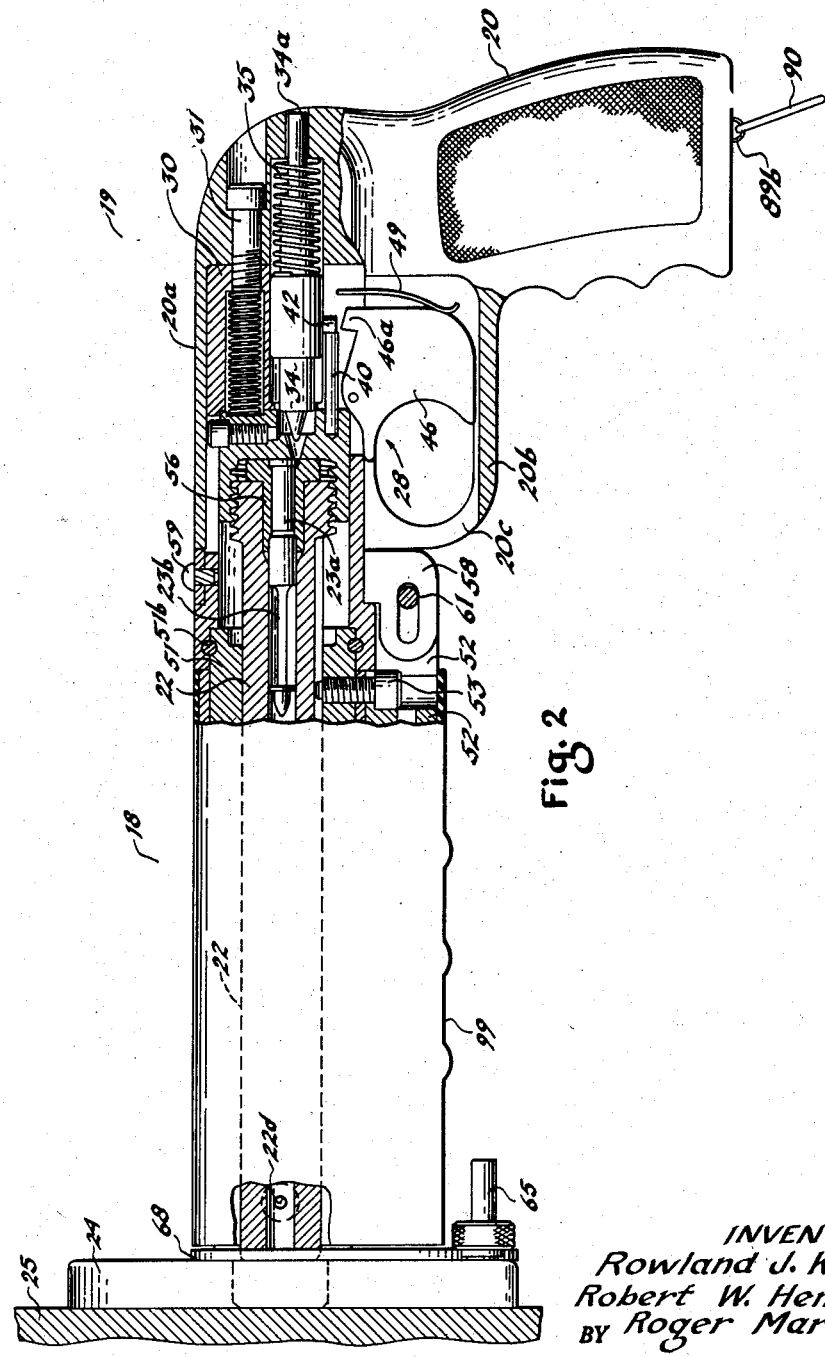
Fig. 2 is a side elevational view of the tool in Fig. 1 partly in vertical longitudinal section with the barrel muzzle and tool pressed against the workpiece on the left with the tool in the ready-to-fire position.

The muzzle of the tool also includes a flash shield 24 in Fig. 1 biased toward the left by spring 26 so as to firmly engage the workpiece 25 in Fig. 2 to protect the tool operator from ricochets and spalling of the workpiece 25.

The barrel assembly 18 in Fig. 1 has barrel 22 surrounded by a first portion of the tool housing 21 hereinafter called barrel housing 50. The breech member or assembly 19 has the powder charge firing means 28 surrounded by the second portion of the housing 21 hereinafter called breech housing 27. This latter housing portion comprises a one-piece receiver housing 20a, hand grip 20 and trigger guard 20b and also includes a firing mechanism housing 30 inserted into the cylindrical bore of the receiver housing 20a and held therein by a screw 31.

A firing pin 34 in Fig. 1 travels in the bore of the firing mechanism housing 30 and is resiliently biased by a firing pin spring 35 to move toward the left in Fig. 1 toward the barrel in the general axial direction of the barrel bore. The firing pin spring 35 is captured between the firing pin bore and in the firing mechanism housing 30 and an aligned bore in the receiver housing 20a so that the firing pin is normally urged to the left in Fig. 1 until it encounters the shoulder 30a of its surrounding bore.

Figure 3:
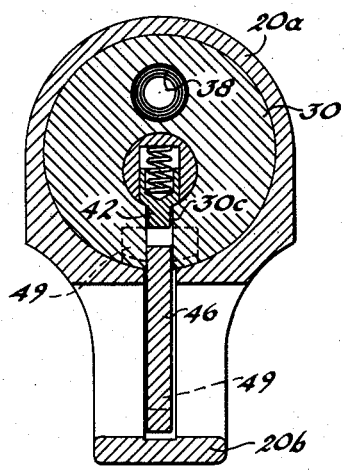
Fig. 3 is a vertical, transverse sectional view taken along the line 3—3 in Fig. 1 through the firing pin, pawl, and trigger of the powder charge firing means.
Figure 4:
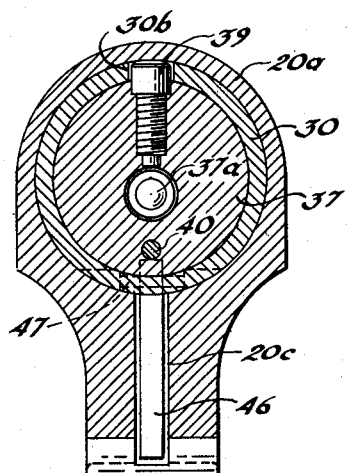
Fig. 4 is a vertical, transverse sectional view taken along the line 4—4 of Fig. 1 through the breech block and front of the trigger guard.

A breech block 37 in Figs. 1 and 4 is mounted for relative axial movement but no rotational movement relative to its surrounding housing 27 in the bore extending inwardly from the left into firing mechanism housing 30. A breech block screw 39 has its head traveling in an axially extending slot 30b of the firing mechanism housing 30 so that relative axial movement but no rotational movement can take place. The housing 30 is movable axially relative to not only the barrel 22 but also the breech block 37 between the normal, first or safety position (Fig. 1) and a ready-to-fire position (Fig. 2), in the latter position the breech block 37 being located closer to the rear of the housing 27. A firing mechanism spring 38 biases the breech block 37 toward the left in Fig. 1 so that the breech block will always be normally in the safety position advanced toward the left for detachable connection over the chamber of the barrel. Both springs 26 and 38 normally urge the barrel and the breech block 37 toward the left in Fig. 1 so as to normally assume the safety position. However, when the barrel muzzle is pressed against the workpiece 25 in Fig. 2, the force of these springs is overcome so that a firing pin pawl 42 on the firing pin 34 moves into contact with a cocking rod 40 on the breech block for exerting a force against the pawl in the direction of firing pin cocking travel as the tool moves from the first to the second positions respectively shown in Figs. 1 and 2 so as to cock the firing pin. It should be noted that the firing pin 34 is cocked in response to the relative movement between barrel 22 and the tool housing 21 from the first to the second position since the cocking pin 40 is fixed with respect to the barrel. The cocking of the firing pin is entirely independent of actuation of trigger 46 pivotally mounted by a trigger pivot pin 47 in a slot 30c cut in the bottom of the firing mechanism housing 30 in Figs. 1 and 3. The trigger 46 is not only inoperative to cock the firing pin 34 but also normally inoperative to release the firing pin when the tool is in the Fig. 1 position.

However, the trigger 46 is manually operable to release the firing pin 34 to strike the primer and explode the powder in the cartridge case 23a when the tool is in the ready-to-fire position of Fig. 2. As the trigger is pulled and pivots counterclockwise around the pin 47, a sear 46a on said trigger moves upwardly to depress the firing pin pawl 42 in a direction at a right angle with respect to the firing pin travel and against the resilient bias of its firing pin pawl spring 43 so that the firing pin moves free of the restraining action of cocking rod 40. Then, the firing pin spring 35 will drive the firing pin 34 toward the left through the aligned firing pin hole 37a to strike the primer of cartridge case 23a.

It should be noted that the cocking rod 40, firing pin pawl 42, firing pin 34 and firing pin hole 37a always keep in correct alignment because the breech block 37 cannot rotate since its guide screw 39 travels only longitudinally in slot 30b of the firing mechanism housing 30 and since cocking rod 40, the trigger 46 and the firing pin pawl 42 all travel within the restraining side walls of slot 30c of the firing mechanism housing 30, as seen in Figs. 1, 2 and 3, to prevent rotation of these parts relative to housing 30.

After the trigger 46 has been released, the trigger return spring 49, bearing against the rear edge of the trigger rotates it clockwise to the Fig. 1 position, so that the pawl 42 can be pushed without interference to a position above it, corresponding to Fig. 2, when the tool is used again. The trigger spring 49 is of T-shape with an upper cross bar thereon vertically inserted up into a pair of slots straddling the slots 30c in the bottom of the firing mechanism housing in dotted lines in Fig. 3.

Although springs 26 and 38 normally urge barrel 22 to the Fig. 1 safety position, firing pin spring 35 also urges it toward the left and a safe position through interconnected pawl 42 and rod 40 to assure that firing pin 34 will be safely spaced from cartridge case 23a.

Although the breech assembly 19 includes an interconnected breech block 37, firing pin 34, trigger 46 and handle or pistol grip 20 extending laterally from the bore axis of the barrel member, the parts are specifically constructed for rapid and convenient assembly. It breaks down into two units. A first unit comprising the integrally formed receiver housing 20a, hand grip 20 and trigger guard 20b having an opening in the receiver housing from the front thereof (from the left in Fig. 1). The front of the trigger guard, instead of being solid as a conventional trigger guard, is divided into two arms by a downwardly protruding slot 20c in Figs. 1 and 4 having an open front and an open top communicating with the cylindrical bore in the front of the integral member for surrounding the firing mechanism housing 30. The second unit comprises a firing mechanism with the firing mechanism housing 30, firing pin 34, firing pin spring 35, breech block 37, firing mechanism spring 38, breech block screw 39, cocking rod 40, firing pin pawl 42, firing pin pawl spring 43, trigger 46, trigger pivot pin 47, and trigger return spring 49. This second unit, including the aforesaid respective parts, is telescoped rearwardly during assembly into the cylindrical bore in the front of the receiver housing 20a. Since the downwardly extending trigger 46 and trigger return spring 49 are less in width (Fig. 4) than the slot 20c in the front of the trigger guard, this second unit can be telescoped rearwardly as a unit and then can be secured in position by the screw 31. It should be noted that the firing pin spring 35 is housed in aligned bores in the receiver housing 20a and firing mechanism housing 30. This two unit construction permits the entire second unit to be assembled within the firing mechanism housing 30 before assembly into the receiver housing 20a since the trigger and its return spring are narrow enough to pass through the slot 20c during assembly.

The barrel assembly 18 includes the barrel 22 surrounded by barrel housing 50, as mentioned before. A screw 53 secures an outer tube collar 51, telescopically mounted over the barrel, within an outer tube 54 and also secures a hinge bracket 52 to the outer surface of the outer tube 54. The barrel housing 50 comprises collar 51 and tube 54.

The chamber of the barrel 22, located at the breech, has a detachable breech plug 56 insertable into or removable from said chamber during loading and unloading with the bore of said plug adapted to receive a cartridge case for driving a fastener through the barrel, as shown in Fig. 2.

Figure 9:
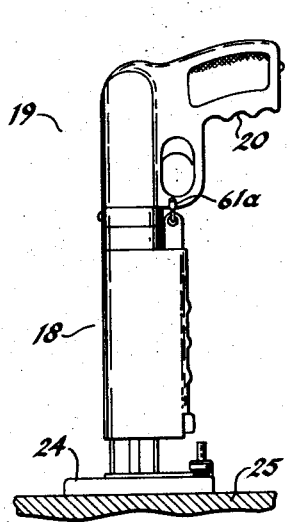
Figs. 9 and 10 are side elevational views of the tool respectively with its assemblies screwed together for firing and pivoted open for loading.
Figure 10:
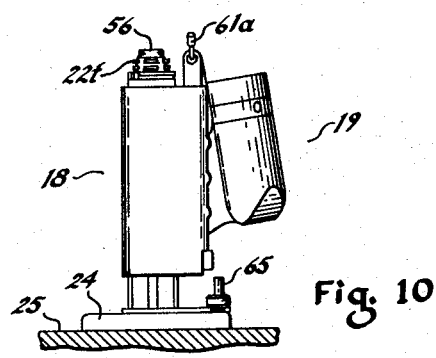

A detachable and pivoting connection is provided between the tool assemblies 18 and 19 so that these assemblies can be detachably secured together, the tool either assuming the Fig. 1 and Fig. 9 locked relationship or unlocked, detached and swung to the Fig. 10 position for loading and unloading. The breech block 37 has a telescopic connection fitting over the breech of barrel member 22 with mating screw threads 37t and 22t respectively in Figs. 1, 5, 10 and 13 extending along an axis in the same general direction as the barrel bore. However, as seen on the barrel member 22 in Fig. 13, the threads extend only for a short arcuate length and the same corresponding arcuate length and spacing exists on the breech block 37 so that the mating threads 37t on the breech block may be telescoped through the gap between the threads 22t on barrel member 22 until the tool is substantially closed and then only one-eighth turn is necessary to fully lock or unlock the tool. The threads 22t and 37t are shown in circumferential registration with the tool in fully locked position in Fig. 5. The threads on the barrel member 22 and the breech block 37 are each arranged in four equal width sector shaped thread groups equally circumferentially spaced with the spacing between each group larger than the width of any thread group of both threads 22t and 37t for adequate clearance during the telescopic action.

Figure 5:
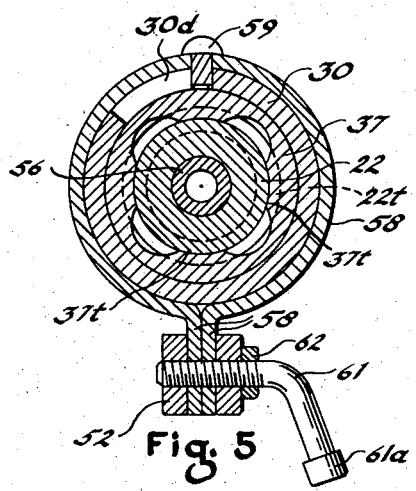
Fig. 5 is a vertical, transverse sectional view taken along the line 5—5 of Fig. 1 through the screw coupling between the breech block and barrel when the tool is fully locked.

Connecting means are provided between the barrel assembly 18 and the breech assembly 19 for pivotal, axial and rotative relative movement between these two tool assemblies. This includes a hinge ring 58 in Figs. 1 and 5 positioned between spaced shoulders on the front of the receiver housing 20a and on the firing mechanism housing 30 to provide an annular groove to rotate ring 58 relative to the hand grip 20. A register pin 59 in Fig. 5 is driven into and secured within a hole in hinge ring 58 so as to travel in a 45° arcuate slot 30d in the firing housing mechanism 30 to provide the one-eighth relative turning action necessary for locking or unlocking the tool. A pivot hinge is provided by downwardly extending ears on the hinge ring 58 in Fig. 5 coacting with rearwardly extending spaced ears on the hinge bracket 52. Each ear on the hinge ring 58 has an elongated slot therein, as shown in Fig. 1, so as to make possible the axial or telescopic action. Hinge screw 61 is screwed into threaded holes in the ears of the hinge bracket 52 while freely traveling in these elongated slots. A locking nut 62 is provided on the screw 61 to firmly lock the assembly together.

This construction permits assemblies 18 and 19 to move from the locked position in Figs. 1 and 5 to an unlocked and disassembled position. The assemblies 18 and 19 rotate relative to each other in moving between these positions. Barrel assembly 18 carries non-rotatively therewith barrel 22, hinge bracket ears 52, screw 61, hinge ring 58 and register pin 59. Hence, during relative rotation of the assemblies between said positions, the ring 58 rotates in its groove in breech assembly 19. The axial movement of the assemblies 18, 19 is permitted by the elongated slot in each ear on hinge ring 58 in Fig. 1 while the pivotal movement is permitted by the hinge connection provided by screw 61, the ears on hinge ring 58, and the ears on hinge bracket 52.

Figure 7:
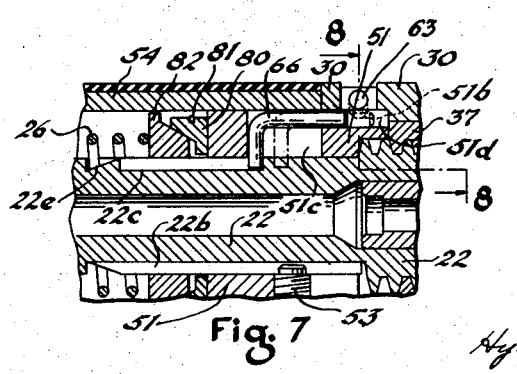
Fig. 7 is a longitudinal, radially extending, sectional view taken along the line 7—7 of Fig. 6 through the interlock pin and barrel guide screw.
Figure 8:
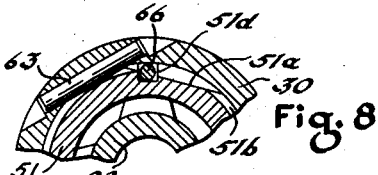
Fig. 8 is a vertical, transverse sectional view taken along the line 8—8 of Fig. 7 to disclose the locking action of the interlock pin.

Means is also provided for securing together at the breech the housing portions 27 and 50 in both assemblies 18 and 19. Firing mechanism housing 30 has at its forward end two diametrically spaced over-latching pins 63, 63 in Fig. 1 with each pin driven through a hole therein, as shown in Fig. 8, with the inner edge of each pin extending into the bore of firing mechanism 30 that telescopes over the outer tube collar 51. The outer tube collar 51 has diametrically aligned flats 51a, one of which being shown in Fig. 8, on its peripheral surface so that each pin 63 can telescope over its associated flat 51a as the breech block 37 telescopes over the breech of the barrel 22. Then, when the breech block is turned one-eighth turn with respect to the barrel to lock the threads 22t and 37t together, both overlatching pins 63, 63 are rotated into the groove 51b in Figs. 1, 7 and 8 in the outer surface of the outer tube collar 51 so as to lock the assemblies and housings together.

Hence, it is readily seen that the tool assemblies 18 and 19 can be moved to either the assembled relationship in Fig. 9 for firing or the disassembled relationship in Fig. 10 for loading and unloading. The tool is so constructed so that if the surface upon which the open tool is rested, which may be the surface of the workpiece 25, is approximately horizontal, as shown in Figs. 9 and 10, the tool will remain upright when the assemblies are either screwed together for firing, as shown in Fig. 9, or pivoted open for loading or unloading, as shown in Fig. 10, because the shield 24 has a surface engagement portion along its periphery located a sufficient distance from the barrel axis and all the parts of the tool to prevent tipping. It should be noted that the relative pivotal and rotational movements of the breech assembly 19, because of the arrangement of the hinge pin 61 transverse to the axis of the barrel bore and the travel of register pin 59 in the arcuate slot 30d in Fig. 5, is such that the assembly is laterally swingable toward the barrel assembly 18 to bring the center of gravity of the tool well within the periphery of the shield and nearer the shield despite the lateral offset of the tool center of mass. Fig. 10 illustrates the breech assembly 19 in this inwardly swung position. Hence, the tool will stand upright on any flat horizontal surface to provide greater convenience in loading and unloading, easier disposal of the tool between shots or series of shots, a better appearance, and easier operation because it does not tend to fall over despite being bumped and does not have to be frequently lifted and reoriented.

After the breech plug 56 has been removed from the barrel chamber, the fired cartridge case must be ejected from its bore. An ejector rod is preferably provided on the tool in any convenient place for this purpose, but two different types are illustrated in Fig. 10. First, a rod 61a in Figs. 5 and 10 is formed integral with the projects from the hinge screw or pivot pin 61. Second, a rod 65 is formed integral with a locking screw on the flash shield 24. Both rods have a diameter less than the breech plug bore and are sufficiently long so that when the breech plug 56 is removed from the barrel chamber after firing and telescoped over said rod, the spent cartridge case 23a will be ejected from the bore. It should be noted that the workpiece 25 always backs up both rods 61a and 65 to serve as a firm base for the ejecting action since both rods extend generally perpendicular to the workpiece surface or generally in the same direction as the barrel bore. The jam or lock nut 62 in Fig. 5 on the hinge screw 61 can be tightened to assure that rod 61a will be retained at the most convenient angle for operator use. With either rod 61a or rod 65, the number of parts in the tool is reduced since each is formed integral with another necessary tool element. Each rod is located for user convenience. Also, the location of rod 61a immediately adjacent to the barrel chamber is especially convenient.

The tool is easily and readily loaded and unloaded. To open the tool, the operator grasps the barrel housing 50 of the barrel assembly 18 in one hand while grasping the handle 20 in the other. Then, the handle 20 is rotated one-eighth turn counterclockwise as viewed from the hand grip 20 looking toward the shield 24. The handle 20 is then drawn upwardly in Fig. 9 relative to the barrel to disassemble by a telescopic action the breech block 37 from the barrel breech. Then, the handle 20 is pivoted about hinge pin 61 and is rotated until it rests against the barrel assembly 18 to assume the Fig. 10 position. The operator removes the breech plug 56 from the barrel chamber and telescopes it over either rod 61a or rod 65 in Fig. 10 to eject the spent cartridge case 23a. Then, fastener 23b (Fig. 2) is inserted point first into the barrel bore through the breech and a new cartridge case 23a is inserted into the bore of the breech plug 56 after which the breech plug is inserted into the barrel chamber. The tool is locked or closed by grasping the outer surface of the barrel assembly 18 in one hand and the hand grip 20 in the other and then reversing the opening or unlocking procedure in swinging, telescoping and rotating through a one-eighth turn the breech assembly 19.

Figure 13:
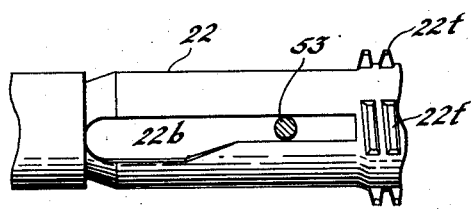
Fig. 13 is a sectional view taken along the line 13—13 of Fig. 6 of the barrel guide slot in the outside surface of the barrel with the barrel guide screw in section coacting therewith.

As mentioned before, after the tool assemblies are locked closed in the Fig. 1 position, the tool housing 21 must be telescoped to the left over the barrel 22 to cock the firing pin by moving the tool from the first, normal or safety position in Fig. 1 to the ready-to-fire or second position in Fig. 2. Although during this movement the tube collar 51 must telescope over the barrel 22 in Fig. 1, there must be very little relative rotation therebetween or else the screw threads 22t and 37t on the barrel breech and the breech block 37 respectively may unscrew and dangerously open the breech during firing. The screw 53 in Figs. 1 and 13 is used not only to assemble the parts but also as a barrel guide screw by coacting with the slots 22a, 22b. Hence, the outer tube collar 51 can be moved endwise or axially in a telescopic manner over barrel 22 but will not appreciably rotate relative thereto. The slot has a widened portion 22b for cooperation with the barrel guide screw 53 when the tool approaches and is in the ready-to-fire position of Fig. 2 so as to prevent turn jamming the barrel in the ready-to-fire position. The end 22a of the slot is of minimum width to guide the barrel guide screw 53 so as to minimize rotation of the barrel 22 relative to its surrounding barrel housing 50. If this narrow width were carried the full length of the slot or groove, necessary minimum rotation of the other parts of the tool required for clearance and ease of operation might permit the tool operator, by twisting the tool component parts relative to each other after the tool was depressed against the workpiece in the Fig. 2 position, to bind the side of groove or slot 22a against the barrel guide screw 53 by "turn jamming" to jam the barrel in the Fig. 2 position for so called "air firing." Then, the tool could be removed from the workpiece, while keeping the tool parts bound in the Fig. 2 position, so as to fire the fastener like a gun driven projectile into the air by "air firing" instead of into the workpiece. If "turn jamming" could occur, the tool could be fired in the same manner as a gun with fastener 23b being dangerously used as a projectile. This firing could occur even though the barrel muzzle was not pushed up against a workpiece 25 since any "turn jamming" would prevent the barrel 22 traveling forwardly to its Fig. 1 safety position under the bias of springs 26 and 38 upon removal of the tool from the workpiece. The groove end 22b is thus widened so that once the tool is locked and brought to the ready-to-fire position in Fig. 2, the barrel guide screw 53 is in the wide portion of the guide groove to prevent turn jamming.

Figure 6:
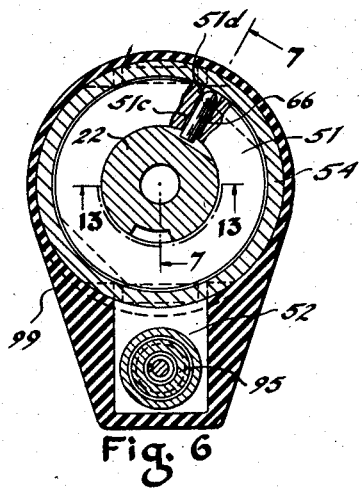
Fig. 6 is a vertical, transverse sectional view taken along the line 6—6 of Fig. 1 through the rear of the extension rod unit with a portion of the housing surrounding the barrel broken away to expose an interlock pin.

After the one-eighth turn locking action has taken place so that the tool is locked in the Figs. 1 and 5 position, and the housing 21 is moving to the left over the barrel 22 from the Fig. 1 safety to the Fig. 2 ready-to-fire position, an interlock means on the housing 21 is responsive to the movement of the housing 21 relative to the barrel approaching said ready-to-fire position for locking the breech block 37 and the whole breech assembly 19 against detachment from the barrel 22 and barrel assembly 18 during firing. Figs. 6, 7 and 8 disclose an interlock pin 66 of generally L-shape having its short legs traveling above a flat 22c on the barrel while the remainder of the pin slides in a through radial slot 51c in the outer tube collar 51 and a peripheral slot 51d also therein with both of these slots generally extending in and interlock pin 66 movable in the barrel axis direction. Fig. 7 discloses the interlock pin 66 in the unlocked position in solid lines when the tool is in the Fig. 1 position and discloses the interlock pin in locked position in dot-dash lines when the tool is in the ready-to-fire Fig. 2 position since the shoulder at the left end of flat 22c pushes against the vertical leg of the interlock pin 66 to move it to the dot-dash line position. In the dot-dash line or locked position, the horizontal leg of the interlock pin 66 travels axially to the right in Fig. 7 back into the cutout formed by the bore in the firing mechanism housing 30 past the overlatch pin 63 so that the assemblies cannot become fully unscrewed. Any attempt to rotate the firing mechanism housing 30 relative to the outer tube collar 51 for unscrewing the threads 22t on the breech of the barrel would be prevented because the overlatch pin 63 in Fig. 8 cannot rotate out of the peripheral groove 51b into the clearance flat 51a for removal since the interlock pin 66 blocks its travel.

It should also be noted that if the assemblies are not fully screwed together when the breech assembly 19 has been turned relative to the barrel assembly 18, movement of the tool from the Fig. 1 toward the Fig. 2 position will be blocked for safety purposes when interlock pin 66 abuts against the shoulder in the bore formed by the overlatch pin 63 in Fig. 8 and thus prevent the tool from attaining the ready-to-fire position of Fig. 2.

It should be also noted that interlock pin 66 is unlocked in response to the movement of the tool away from the Fig. 2 ready-to-fire position since the shoulder on the right end of the barrel flat 22c engages the vertical leg of the interlock pin 66 to pull it from the dot-dash to the solid line position in Fig. 7. When the interlock pin 66 is in the dot-dash line position in Fig. 7, it is possible for the tool operator, by relatively twisting the tool assemblies 18 and 19 toward their unlocked position, to bind the lock pin 66 in this position against the side of its mounting slot in collar 51. However, the barrel 22 is free to move a substantial distance toward the Fig. 1 or safety position as soon as the barrel muzzle is removed from the workpiece even though the interlock pin 66 itself may be jammed, because the flat 22c between its end shoulders is of substantial length to serve as a lost motion movement transmitting means between barrel and pin and because springs 26 and 38 will bias the barrel toward the safety position.

This structure prevents (1) firing the tool in the unlocked position, (2) inadvertent unlocking of the tool in its ready-to-fire position or firing position, and (3) any deliberate attempt to turn jam the tool for "air firing."

The timing between the barrel guide slot action and the interlock pin action is clearly shown in Fig. 7. The interlock pin 66 is effective (moved to its dot-dash line position in Fig. 7) when the barrel guide screw 53 reaches the wide portion 22b of the elongated barrel guide slot in Fig. 13.

Figure 12:
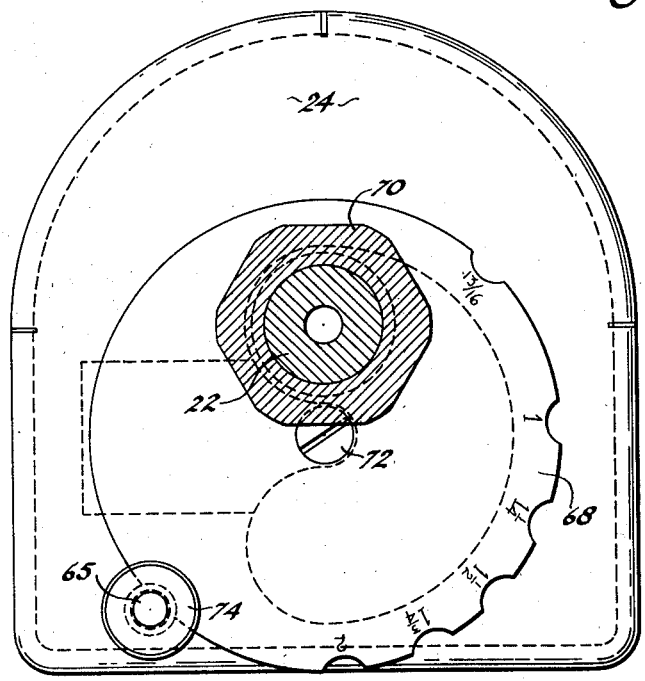
Fig. 12 is a vertical, transverse sectional view taken along the line 12—12 in Fig. 1 looking toward the flash shield.

Flash shield 24 and its appurtenant parts are shown in more detail at the left in Fig. 1 and in Fig. 12. This flash or deflector pad shield 24 is telescopically mounted over the barrel 22 near its muzzle and is adapted to engage for safety purposes the workpiece 25, as shown in Fig. 2, during driving of the fastener 23b. This shield 24 has a plate 68 rotatably secured thereto by a screw 72 and nut 73 connection in the center of the plate 68 but laterally spaced from the bore of barrel 22. A hydrogen braze secures the plate 68 to a shield tube 70 extending away from the shield 24 toward the right in Fig. 1. Both the shield 24 and the tube 70 are telescopically mounted over the barrel 22. The shield tube 70 telescopes through the open end on the left and into the outer tube 54 in Fig. 1.

The plate 68, screw and nut connection 72, 73, and the shield 24 coact together to form an adjustable gage for spacing driven fasteners. The shield 24 can pivot around the screw 72 in Fig. 12 on an axis spaced from the barrel axis so that pivoting the shield 24 will move it eccentrically with respect to the barrel axis and the indicia and reference marks on shield 24 and plate 68 can be used in spacing fasteners since the shield tube 70 is nonrotatably mounted with respect to the barrel 22, as will be brought out in more detail hereinafter. A clamping screw 74, threaded into the shield 24, has a shoulder removably engageable with one of the plurality of notches on the periphery of plate 68 in Fig. 12 for securing the shield 24 in any given fastener spacing or eccentric position. This clamping screw 74 has projecting therefrom and integrally formed therewith the ejection rod 65 in Figs. 1 and 10 for ejecting the spent cartridge case 23a from the breech plug 56, as described heretofore.

The shield 24 is resiliently biased toward the left in Fig. 1 so as to move on the barrel 22 and within the outer tube 54. Helical shield spring 26 is telescoped over the barrel 22 to not only bias the breech assembly 19 toward the first or safety position in Fig. 1 but also urge the flash shield 24 against the workpiece into which the fastener is to be driven. Stop means on the barrel muzzle on the left in Fig. 1 abuts against or is effective upon the left end of the spring and comprises a thread protector barrel cap 75 screwed onto the barrel muzzle and having a slightly larger outside diameter than the barrel for arresting the leftward movement of the shield 24 and shield tube 70 located between the spring 26 and the thread protector cap 75. The right end of the spring 26 in Fig. 1 is effective upon the collar or stop ring 51, which telescopes over the barrel 22 as the tool moves between the different positions. Therefore, moving the tool from the first position in Fig. 1 to the second or ready-to-fire position in Fig. 2 will compress the spring 26. As illustrated in Figs. 1 and 2, the tool is constructed to fire fasteners into a flat surface on workpiece 25. The thread protector cap 75 on the barrel in Fig. 1 serves by abutting stop engagement as a means for preventing the flash shield from traveling in a direction away from the barrel breech beyond an approximately flush position with respect to the barrel muzzle and thus limit the effective travel of spring 26.

The flash shield 24 for any given spacing adjustment is non-rotatably mounted with respect to a unit comprising the barrel 22 and the outer tube 54, but may be selectively indexed with respect thereto so that the adjustment indicia thereon in Fig. 12 will always be in the best workable position for view by the tool operator. Means are provided for detachably connecting the shield tube 70 at any one of several spaced arcuate intervals within the outer tube 54. This comprises a bracket 77 in Fig. 11 welded in a notch in outer tube 54 and extending inwardly so as to provide a flat across one side of the cylindrical bore of outer tube 54. The shield tube 70 has a polygonal peripheral cross section telescoped into the circumscribing cylindrical bore of the outer tube 54 to restrain it against appreciable lateral movement as the flat or projection on bracket 77 engages one of the polygon sides on the shield tube 70, in the present disclosure a regular hexagonal outer surface, to prevent relative rotation between the tubes 54 and 70. Barrel 22 and shield tube 70 cannot appreciably rotate relative to each other because barrel guide screw 53, fixed in outer tube 54, restrains the barrel against rotation as it travels in barrel slots 22a, 22b. It should now be clearly apparent that the thread protector barrel cap 75 can be unscrewed from the muzzle of the barrel 22 so that the shield tube 70 can be withdrawn from the bore of outer tube 54 and then reinserted in one of the six possible positions before reassembling the thread protector cap 75 so that the indicia on plate 68 and the reference marks on the shield 24 will be in their best workable position for easy viewing by the tool operator.

Figure 11:
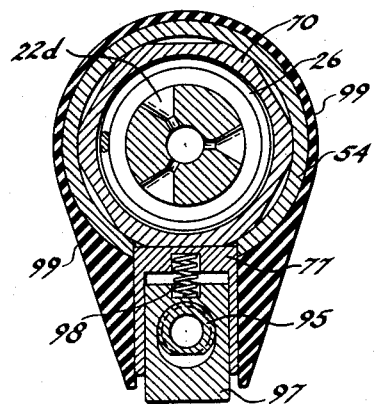
Fig. 11 is a vertical, transverse sectional view taken along the line 11—11 in Fig. 1 through the spring loaded extension rod release button and the deflector pad, flash shield telescopic mounting in the tool housing.

The barrel 22 has a plurality of ports 22d therein immediately behind a fully driven fastener for gas escape from the barrel bore. Although the portholes should be each of bore diameter for best performance in diverting the gases, each porthole is made a slightly smaller diameter than the barrel bore so as to retain the wad material from cartridge case 23a in the bore. However, each porthole is funneled outwardly in a conical shape (Fig. 11), to give a larger diameter and freer gas flow at the outside of the barrel. As shown in Fig. 11, these portholes are spaced at 120° intervals. The portholes should not be located closer to the breech or muzzle than is necessary. Their location relative to the muzzle is determined by the length of the fastener 23b remaining in the barrel 22 after firing. The portholes are symmetrically spaced radially around the barrel to provide a balanced force from the gas jets emerging from the ports.

A satisfactory construction has been obtained with the following dimensions. It should be clearly understood, however, that these dimensions are merely illustrative and not limiting in any sense. The first porthole 22d on the left in Fig. 1 is approximately ⅞ inch from the muzzle while the others are located at ⅜ intervals. The bore of barrel 22 is approximately ¼ inch while its outside diameter is about .79 inch. Each porthole is made by drilling and counter-sinking with a No. 1 E.R. centering drill until the largest diameter of the counter-sink is approximately .300 inch. Then, the hot gases are diverted from the bore after they have given the fastener the necessary velocity so that the surplus gases do not bypass the fastener to strike the workpiece 25 to spall and to burn it.

After the surplus gas emerges from the ports 22d it travels to the right in Fig. 1 between the outer surface of the barrel 22 and the bore of shield tube 70, around the right end of shield tube 70 in Fig. 1, and outwardly toward the left between the outer surface of the shield tube 70 and the bore of the outer tube 54 to strike against the back of plate 68 to force the shield 24 firmly against the workpiece 25 before escaping radially outwardly past the open end on the left of outer tube 54. Hence, the five flats on the outer surface of the shield tube 70 in Fig. 11 coact with the circumscribing bore of outer tube 54 to permit escape of the surplus gas. The five equal cross sectional area spaces meter the outwardly flowing gas into five jets with equal flow volume, equally position the jets around the shield tube 70, and increase the gas velocity (because of the small cross sectional area of each space) so that the gas jets strike the plate 68 at high velocity with substantial force equally distributed around the barrel bore so as to force the shield firmly and uniformly against the workpiece 25.

The exhaust gases not only firmly drive the shield 24 against the workpiece 25 and hold the barrel 22 against the workpiece by pushing against shoulder 70a in shield tube 70 and against plate 68, but also reduce the recoil of the tool. The angle at which ports are placed relative to the center line of the bore has a material effect on recoil reduction. This reduction in recoil is borne out by use of the actual tool.

Since the exhaust gases travel through and between the telescopic tubes and barrel of the tool, it is absolutely necessary that the ports be too small to permit pieces of gas-borne foreign matter, such as wad material, to escape from the ports since any foreign material could cause malfunctioning of the tool by getting between the telescopic members and other gas exposed parts thereof.

Some tool operators may attempt to improperly use the tool without flash shield 24 and spring 26. The tool has, as a safety feature, means which prevents the tool from being used in the absence of parts 24 and 26. Since it is always desirable for safety reasons to use the safety flash shield 24 and its spring 26 so as to use the tool properly, means has been provided to prevent the firing of the tool unless they are used. This is a safety feature protecting the tool operator primarily against ricochets and incidentally against damage to his ear drums because this structure acts somewhat like a silencer, etc. This takes the form in the present disclosure of a barrel engageable latching means located between the stop ring or collar 51 in Figs. 1 and 7 and the right end of shield spring 26. A split annular gripper member 80 serves as a lock or latch adapted to engage in the groove 22e on the periphery of the barrel with an annular C-shape spring 81 biasing these members inwardly and tending to force the split gripper portions closed or into engagement with this groove 22e. In the latching position, the location of these split gripper portions and groove is such that if they are permitted to engage the groove in the barrel, forward movement of the collar 51 relative to the barrel 22 is stopped after a predetermined point so that the collar 51 prevents further movement to the firing pin cocking position. The bore of the gripper portions on the left in Figs. 1 and 7 is constructed in the form of a female cone with its large end to the left. A barrel lock release 82, annular in form, has a male cone surface on the right designed to mate and cooperate with the female cone previously described. This barrel lock release 82 is driven axially toward the right by spring 26 when the tool is properly used with the flash shield 24 and spring 26 so as to hold the gripper portions 80 out of latching engagement with the barrel groove 22e so as to keep the barrel gripper portions 80 in the unlatching position during normal usage. However, when the shield 24 and spring 26 are removed, there is no spring pressure against barrel lock release 82. Therefore, the annular spring 81 resiliently pulls the gripper portions 80 inwardly into engagement with the barrel surface so that they will engage in the groove 22e as soon as the tool is moved sufficiently toward the ready-to-fire position. Hence, the latching means would be in its latching position, being biased thereto by the spring 81, for preventing firing of the tool if shield 24 and spring 26 are eliminated and the tool is not properly used.

Figure 15:
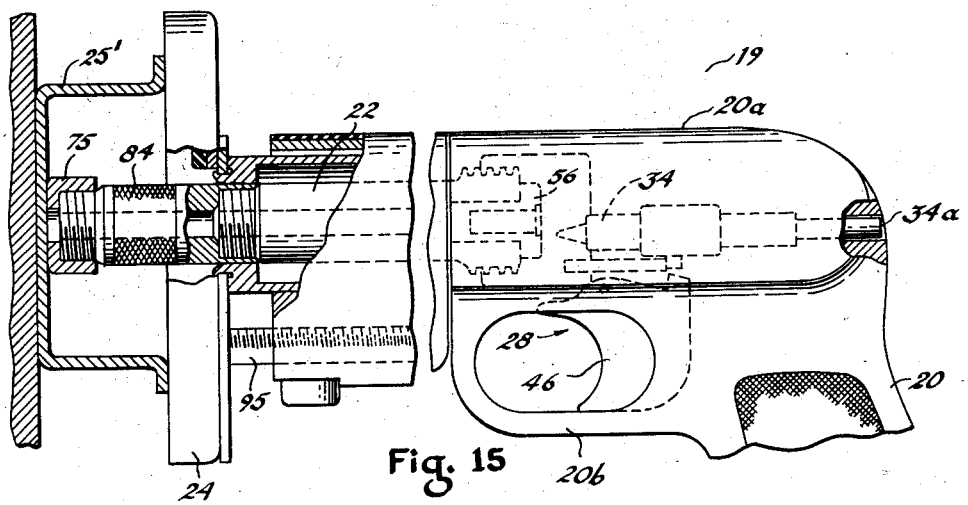
Fig. 15 is a side elevational view, partially in section, of the tool in a ready-to-fire position corresponding to Fig. 2 but having a barrel extension and the extension rod in use.

When the fastener 23b is to be driven into a depression on the surface of the workpiece, such as in workpiece 25' in Fig. 15, the barrel muzzle must during firing extend out beyond the flush relationship with the end of the flash shield 24 shown in Fig. 2. Since the tool, as illustrated in Fig. 2, could not be used for this type of job because the protruding barrel will not be moved back into the housing far enough to cock the firing pin, a barrel extension 84 in Fig. 15 is generally used and has female and male thread portions on opposite ends for detachable connection between the muzzle of the barrel 22 and the thread protector barrel cap 75. Then, the firing pin and depressible pawl will be properly aligned with the trigger for firing when the tool parts are moved to the ready-to-fire position shown in Fig. 15, corresponding with Fig. 2.

A storage recess is provided in the pistol grip handle 20 of the tool for receiving when not in use the barrel extension 84 or any other type tool attachment desired. This storage recess or bore 20d in Fig. 1 is also provided with a locking means for detachably locking the barrel extension 84 therein. This locking means comprises a one-piece, flat resilient spring latch 89 frictionally and detachably secured in a recess 20e in the pistol grip handle 20 extending inwardly from the bottom of the pistol grip in the same manner and direction as the bore 20d. The latch has a mid-portion 89a, substantially flat, bearing against the bore side of the recess 20e, an attachment retainer portion 89b on one end resiliently biased over the open lower end of the bore 20d but swingable away therefrom for removal of the barrel extension, and its opposite end 89c bent back upon the mid-portion 89a with a sharp distal end engaged in the recess side remote from the bore 20d. The distal end of portion 89b is rolled into a loop rotatably securing a ring 90 for manual manipulation of latch 89.

Within the handle bore 20d is also stored a disk adapter 86 for use in place of the thread protector cap 75 in either Figs. 1 or 15. This disk adapter has a sleeve 86a having internal sleeve-like cap 75 with a spring 87 with a generally annular portion resiliently engaged in a peripheral groove of sleeve 86a and adapted to resiliently hold a flat, circular metallic disk pierceable by the fastener 23b as it emerges from the barrel muzzle and before it enters the workpiece 25 or 25' so as to limit the penetration of the fastener 23b therein.

As mentioned before, the surrounding housing 21 and firing means 28 can be moved endwise relative to barrel 22 in Fig. 1 by pressing the barrel muzzle against the workpiece 25 so that the tool will move from a normal, muzzle advanced, safety position in Fig. 1 to a second, muzzle depressed ready-to-fire or firing position in Fig. 2. However, springs 26 and 38 in Fig. 1 normally urge or bias the barrel 22 toward the first position shown in Fig. 1. Comparison of Figs. 1 and 2 will also reveal that the housing 21 and firing means 28 move relative to or advance toward the flash shield 24 when moving from the first position to the second position. Under some conditions, it is desirable to limit this approach movement so that they will never get together closer than a predetermined distance.

The structure for limiting or blocking the movement of the housing 21 relative to flash shield 24 includes the previously described brackets 77 and 52 in Fig. 1 with both having counter bores therein for receiving the opposite ends of the tube 91. The bracket 77 on the left in Fig. 1 is fixed to the outer tube 54 of the housing 21 while the hinge bracket 52 on the right is removably secured thereto for assembly by the barrel guide screw 53. A hollow extension rod 95 is telescopically mounted within this tube 91. This rod 95 is formed from seamless tubing, has a threaded outside surface and an axial through bore with the seamless tubing construction providing the bore without the necessity of deep-drilling. The extension rod or screw 95 is counterbored from the right end in Fig. 1 and a bushing 96 is inserted therein. This bushing 96 travels on a guide rod 92 anchored at its right end by a generally C-shape retainer snapped into a peripheral groove thereon. A compression spring 94 is located between the retainer 93 and bushing 96 so as to keep the retainer 93 in proper position located against the hinge bracket 52 while also urging the bushing 96 and extension screw rod 95 toward the left in Fig. 1. The threads on the outer surface of the extension screw rod 95 may be of the American Standard form and have coacting therewith corresponding threads on a release button 97 in Figs. 1 and 11 serving as a nut when engaged with the rod 95 but movable in a direction normal to the rod 95. An elongated hole contains the screw threads in the release button and straddles the extension screw rod 95, as more readily seen in Fig. 11. Less than one-half of the circumference of this elongated hole is threaded while remaining portion (lower portion in Figs. 1 and 11) is relieved for clearance during release button movement. The button 97 has its threaded bore portion spring loaded against the extension rod 95. When the bottom of the release button 97 in Figs. 1 and 11 is pushed upwardly by manually exerted pressure, the threaded portions will disengage to allow the extension rod 95 to move toward the left in Fig. 1 under the pressure of spring 94. When the release button 97 is no longer depressed, the pressure of spring 98 moves it downwardly in Figs. 1 and 11 to cause thread engagement and to thus lock the extension rod 95 in whatever axial location it has assumed at that time.

A downwardly projecting stop shoulder 95a on the right end of extension rod 95 is adapted to engage an upwardly extending stop shoulder 77a on the supporting bracket 77 on the left in Fig. 1 when the extension rod 95 is fully extended to prevent the escape of the extension rod 95 during changing or indexing of flash shield 24 if button 97 should be accidentally depressed. A flat is milled on the bottom of the extension rod 95 in Fig. 11 since the threads on the lower side are never used. The portion projecting above the flat provides the stop shoulder 95a and the top of the stop shoulder 77a coacts with the flat to prevent rotation of the extension rod 95 so that the threads thereon are always facing upwardly for the proper coaction with the threads of the release button 97.

It should be noted that the barrel guide screw 53 in Fig. 1 is peculiarly located to provide a multiplicity of functions. It is threaded into the outer tube collar 51 to secure said collar to the outer tube 54 and the hinge bracket 52. The hinge bracket 52 is thus removable from the tools so that the extension rod tube 91 and the multiplicity of parts therein can be disassembled from the tool even though the front tube supporting bracket 77 is fixed to the outer tube 54. Also, the upper tip end of the screw 53 in Fig. 1 travels in the barrel guide slot 22a, 22b to prevent rotation of the barrel 22 relative to the housing while permitting telescopic movement therebetween. This structure provides easy assembly and servicing of the tool parts by authorized personnel.

When the tool is used in the manner shown in Figs. 1 and 2 and it is constructed without the barrel extension 84, the extension rod 95 and its associated parts are used as a safety locking means to prevent moving the tool housing relative to the barrel 22 to the ready-to-fire position in Fig. 2. The tool is normally manipulated by two hand operation necessitated by this safety locking means. One hand grips the pistol grip 20 with the finger in the trigger guard in front of the trigger 46, as on a conventional gun, while the other hand surrounds the outer housing of the barrel assembly with one finger, preferably the index finger, engaging the outer surface of the release button 97 to depress it into the outer housing. It should be noted that the outer housing, extension rod tube, and its supporting brackets are all encased within a rubber or plastic sleeve grip 99 except for the exposed release button 97, as seen in Figs. 1, 2, 6, 9 and 11, for ease of operation and for appearance. It can readily be seen that releasing or manually depressing the button 97 will make the safety operative or inoperative respectively to lock against or to permit axial movement of the extension rod 95. If the button 97 is always depressed when the tool is being operated in two hand operations, the extension rod 95 will always extend forwardly toward the left in Fig. 1 into contact with the flash shield. Then, since the button 97 is held in the safety inoperative or depressed position, the tool housing is permitted to travel the full distance toward the ready-to-fire or firing position in Fig. 2 in the normal manner. However, release of the button 97 will move the safety locking means to its operative position to prevent the tool from traveling further toward the ready-to-fire or firing position if the tool parts are intermediate between the Figs. 1 and 2 positions at the time of button release. Then, the extension rod 95 will engage the back of the flash shield to space apart the housing and firing means 28 carried thereby from the flash shield 24 so as to stop the relative approach movement of the flash shield and housing so that the pressing of the barrel muzzle against the workpiece 25 cannot move the tool to the ready-to-fire or firing position in Fig. 2. This construction makes necessary two hand operation of the tool by constantly blocking the tool movement to the ready-to-fire or firing position except when the button 97 is depressed.

Of course, the tool can be fired by one hand operation or without continuously depressing button 97. Then, extension rod 95 is kept retracted within tube 91, as shown by the solid line position in Fig. 1, and only the hand on grip 20 and trigger 46 is required. However, the safety can be made operative by depressing button 97.

When the tool is used with the barrel extension 84 in Fig. 15, the extension rod 95 is used for a different purpose. Here, the rod 95 assures that both the barrel muzzle and flash shield 24 will be firmly against the workpiece 25' when the fastener 23b is driven and also permits angle fire control, the latter to be discussed in more detail hereinafter. However, the operator must set rod 95 in a predetermined position dependent upon the workpiece depression depth. The operator depresses the release button 97 and pushes the barrel muzzle and flash shield 24 against the workpiece 25' with the barrel axis extending generally perpendicular to the fastener receiving surface of the workpiece. Then, the tool operator releases button 97 and never touches it again as long as the same size workpieces 25' are having fasteners driven therein, in other words, workpieces having the same depression depth. Now, when the tool is used, the flash shield 24 will always be depressed firmly against the workpiece and angle fire control can be utilized so that the tool can only be fired if it is properly oriented with the workpiece.

Although the tool has basically the same angle fire control with or without barrel extension 84, angle fire control can be most clearly explained by referring first to Figs. 1, 2, 9 and 14 wherein the tool is used without the barrel extension 84. A comparison of Figs. 2 and 14 will reveal that merely making contact of the flash shield 24 and barrel muzzle with the workpiece surface is not sufficient to move the tool to the ready-to-fire or firing position since housing tube 54 and shield 24 act as stop means in Fig. 14 to prematurely arrest the movement. The bore of barrel 22 must be approximately perpendicular to the surface of workpiece 25 in order to move the firing pin pawl 42 into alignment with the trigger sear 46a. Squeezing the trigger 46 in Fig. 14 will never fire the tool since both springs 35 and 38 bias barrel 22 and housing away from the ready-to-fire or firing position while pushing the barrel muzzle against the workpiece (spring 26 only pushes flash shield 24 against the workpiece but does not urge the barrel because flash shield 24 does not engage the barrel cap 75). Hence, the barrel bore axis cannot be tilted substantially from the normal to the workpiece surface if firing is desired, the maximum permissible tilt here to have so called "approximately perpendicular" alignment is about 12° or less when the shield is in the Fig. 12 position. The tool is capable of driving a fastener when the tool orientation is 12° or less but is incapable of driving when the tilt is over 12°. Therefore, a fastener 23b cannot be driven at a dangerous ricochet angle against the surface of the workpiece especially when the flash shield 24 is raised from the workpiece surface, as in Fig. 14, so as to permit the escape in a dangerous manner of either the ricochet, spalling, or splattering of the workpiece material. Also, if the firing pin 34 is released after the trigger is pulled, the tool operator can be sure that the firing pin tip has traveled sufficiently far to the left in Fig. 2 to strike the primer of cartridge case 23a. A failure to fire therefore can be blamed only on a dud cartridge case.

It should be noted that the back of firing pin 34 has an extension rod 34a formed integral therewith and slidably in an aperture in the back of the receiver housing 20a. The top or distal end of this rod extension 34a in Fig. 2 is painted a contrasting color so that it is easily visible when it emerges at the mouth of the hole in the housing in response to the relative movement of the firing pin and barrel to the ready-to-fire position of Fig. 2 to serve as a combination tilt and ready-to-fire position indicator since it is not visible when the tool is in the safety position of Fig. 1 or when it is tilted excessively, as in Fig. 14. When the tool is correctly aligned and is in the ready-to-fire position, the tip of the rod 34a is approximately flush with the housing outer surface, as shown in Fig. 2. This construction enables the operator to determine before pressing the trigger that the tool is in its ready-to-fire position, to prevent dud shots with the tool out of position, and to require holding the tool generally square with the surface of the workpiece 25.

Figure 14:
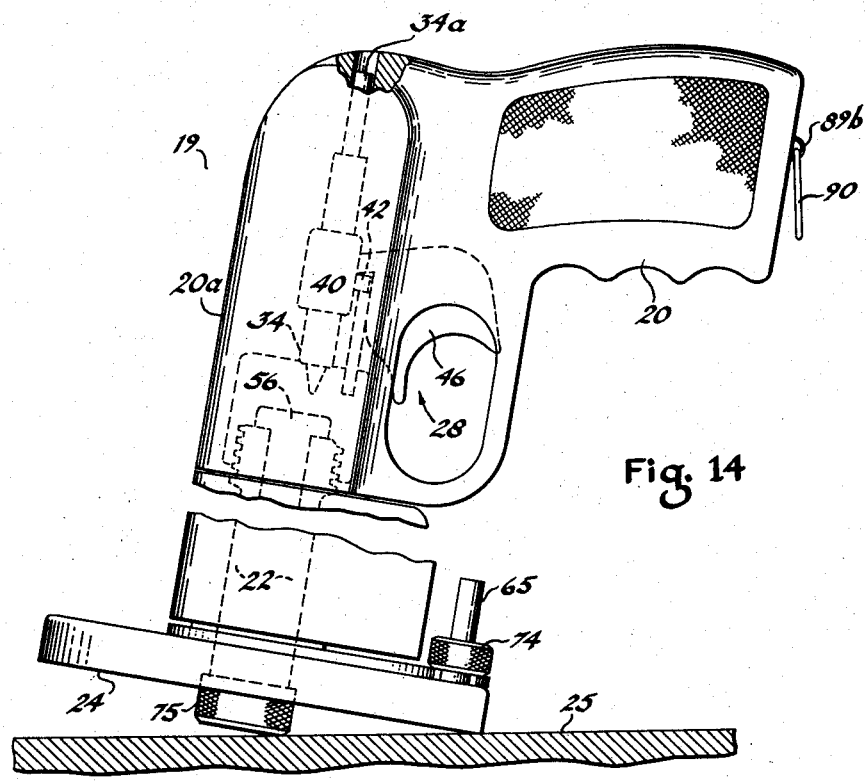
Fig. 14 is a side elevational view of the tool after an unsuccessful attempt has been made to fire it while the barrel axis was tilted a substantial amount with respect to the normal to the workpiece surface.

When the barrel extension 84 is used, the angle fire control takes place in substantially the same manner except that the extended rod 95 in Fig. 15, after being set in the aforedescribed predetermined position corresponding to the depression depth in workpiece 25', acts as a stop means (instead of the stop means formed by the left end of the barrel housing 50 in Figs. 2 and 14) for engagement with the back of the flash shield 24. Hence, this stop means rod 95, flash shield 24 and barrel muzzle in Fig. 15 must be so located that when the flash shield 24 and the stop rod 95 are engaged and when the flash shield 24 and barrel muzzle are pressed against and into engagement with the workpiece, the barrel bore must be approximately perpendicular to the workpiece fastener receiving surface in order to move the firing pin 34 into the ready-to-fire position in Fig. 15 with the trigger sear 46a and firing pin pawl 42 aligned. The adjustability of extension rod 95 assures that the left end of the rod 95 in Fig. 15 will be located at any predetermined distance ahead of the housing 50 for determining the stopping point of the shield 24 to correspond with the depth of the depression in the workpiece 25'. Hence, the extension rod 95, when properly positioned, will assure that both the barrel muzzle and flash shield 24 are properly against the workpiece before the tool can be fired. The barrel will be approximately perpendicular to the workpiece surface, the left face of shield 24 in Fig. 15 will be approximately parallel to the surface it contacts, and the barrel muzzle will be located sufficiently far from the left face of shield 24 in Fig. 15 to allow for the depression in workpiece 25. The variation from perpendicular and parallel must be within the maximum tilt angle in each case. Of course, the maximum tilt angle (corresponding to the previously mentioned 12° tilt) will be determined by the contacting engagement location between shield 24 and workpiece 25' as well as the length of extension of stop rod 95; changing the extended length of rod 95 permits selection of this maximum tilt angle within fixed limits.

Although the barrel extension 84 in Fig. 15 is only illustrated as being used when driving fasteners into a depression on the workpiece, it should be clearly understood that this barrel extension along with the angle fire control and with the tilt and ready-to-fire position indicator 34a may be used even with a workpiece having a flat surface, such as shown by workpiece 25 in Fig. 2. Then, spring 26 urges flash shield 24 over the barrel extension into flush relationship with cap 75, as shown in Fig. 1, when the tool is removed from the workpiece. The adjustability of the extension rod 95 permits the rod to be extended so that the barrel muzzle and flash shield 24 must be substantially flush (with flash shield 24 telescoped over extension 84) when they contact the workpiece before the tool can be fired. In other words, the extension rod 95 is extended from outer tube 54 and bracket 77 a distance equal to the length of the extension barrel 84 in this situation.

The barrel extension 84 may also be used with a flat workpiece 25 when an extra long fastener is being driven so that portholes 22d are sure to be uncovered for gas release. The barrel extension adds a substantial distance between the barrel muzzle and the porthole nearest thereto.

When the workpiece 25 is located at any given height from the floor, the possibility of using the tool either with or without a barrel extension 84 permits making the tool of convenient length. Then, the operator can conveniently grasp hand grip 20 and use the tool without assuming an awkward or uncomfortable position.

The operational sequence in firing a tool should now be quite clear. Grasp the sleeve grip 99 in Fig. 1 in one hand with one finger pressing the release button 97 and grasp the hand grip 20 in the other hand. Locate the tool accurately on the workpiece by the reference marks near the periphery of the flash shield 24 in Fig. 12 and then depress the tool firmly and squarely against the workpiece. Check the firing pin indicator 34a to be sure that its tip is generally flush with the housing so that the tool is in the ready-to-fire position without excessive tilt from the normal to the workpiece surface. Now pull trigger 46 to fire the tool. After firing, continue to depress the safety release button 97 as the tool is withdrawn from the workpiece so that the safety will be automatically operative on release of said button.

Figure 16:
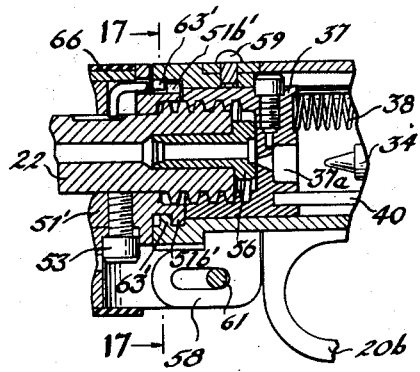
Fig. 16 is a longitudinal, vertical section view through a modified form of detachable connection at the tool breech with this view generally corresponding to the breech portion of Fig. 1.
Figure 17:
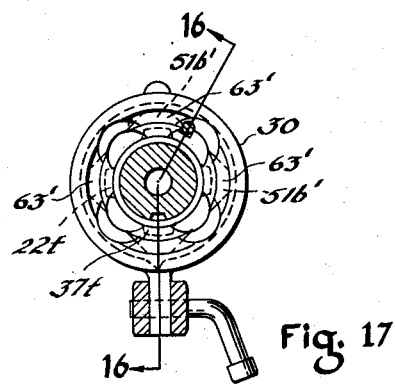
Fig. 17 is a vertical, transverse sectional view taken along the line 17—17 of Fig. 16 and generally corresponding to Fig. 8.

Figs. 16 and 17 illustrate a modified form of bayonet or connecting means between the barrel assembly and the breech assembly and more especially between the housings 27 and 50 thereof. In Figs. 1 and 8 of the previously described construction, a pair of overlatching pins 63, 63 are admitted into a locking groove 51b by a pair of clearance flats 51a. In Figs. 16 and 17, four circumferentially spaced inwardly or radially extending lugs 63' are formed integrally with a modified firing mechanism housing 30' in place of the overlatching pins 63 of Fig. 1. These lugs 63' in Figs. 16 and 17, all lying in a single plane transverse to the barrel axis bore, are held when the tool assemblies are locked axially behind correspondingly circumferentially spaced lugs 51b' extending outwardly from and formed integral with a modified outer tube collar 51'. This locked position is illustrated in Figs. 16 and 17. Adequate arcuate spacing is provided between each pair of adjacent lugs so that they can slip past each other after the one-eighth rotation unlocking turn has been made to move them from axial alignment of locked position to 45° arcuate spacing of unlocked position. This arcuate clearance spacing in Fig. 17 corresponds with the flat 51a in Fig. 8 for permitting the removal of overlatching pin 63. It should be noted that the lug segments 51b' and 63' in Fig. 17 generally correspond in angular arcuate extent and in axial alignment with the thread segments 22t and 37t of Fig. 5 on the barrel 22 and breech lock 37. The interlock pin 66 in Figs. 6, 7 and 8 slides into the cutout formed by the spacing between the axially aligned lugs 51b' and 63' of Figs. 16 and 17 in their locked positions when the barrel is in its ready-to-fire position, in the fully locked tool position of Fig. 17. The other parts operate in basically the same manner as before.

Figure 18:
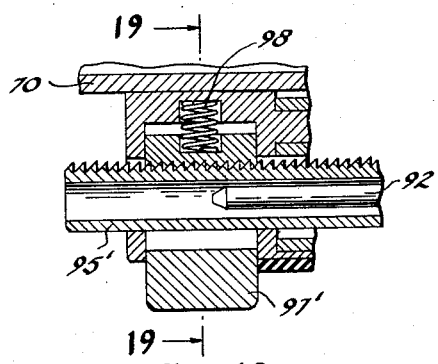
Figure 19:
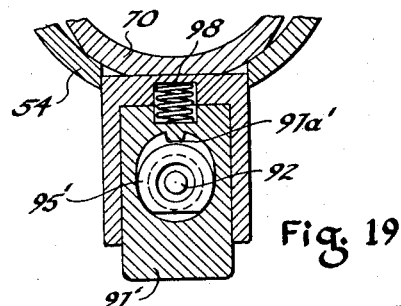
Fig. 19 is a vertical, transverse sectional view taken along the line 19—19 of Fig. 18 and generally corresponding to the lower half of Fig. 11.

Figs. 18 and 19 illustrate a modified thread form on the surface of extension rod pictured in Fig. 1. The modified thread form on modified extension rod 95' in Fig. 18 is of the buttress form thread with a vertical face at the right with a modified release button 97' having threads of a corresponding mating type on its segment 97a' in Fig. 19 making about a 20° contact on the rod thread periphery while the remainder of the button bore is relieved for clearance. The pressure of the rod spring 94 in Fig. 1 is balanced against the release button spring 98 so that the rod spring 94 is capable of continually driving the extension rod 95' toward the left since the left face of each thread in Fig. 18, slanted upwardly toward the right, permitting overriding of the mating threads on the rod 95' and button 97' until the left end of the extension rod 95' engages the back of the flash shield. Hence, the safety rod is always extended in its safety operative position without requiring the operator to always depress the release button 97'. However, when the flash shield 24 and barrel muzzle are pressed against the workpiece to move the tool to the ready-to-fire position in Fig. 2, the extension rod 95' will not automatically move toward the right in Fig. 18 since this movement is resisted by engagement of the normal or vertical right faces of the extension rod threads with the corresponding thread faces on the threaded segment 97a'. Hence, the release button 97' must be depressed in order to move the tool to the ready-to-fire or firing position.

Although the many features of this tool have been described with reference to only a cocking of the firing pin occurring when the tool is moved to the Fig. 2 position so that the firing pin is in the ready-to-fire position, it should be readily understood that many of the features of this tool could also be used if the housing movement relative to the barrel causes automatically not only the cocking but also the release of the firing pin to explode the charge in the cartridge case 23a as soon as the tool reaches the Fig. 2 position. Then, the Fig. 2 position would properly be termed the firing position. Although this mode of operation is generally not as desirable as the mode of operation described heretofore because it is not as safe, it should be clearly understood that the inventive concepts that have been described with reference to the present tool could also be used in a tool not having the ready-to-fire position.

Various changes in details and arrangements of parts can be made by one skilled in the art without departing from the spirit of this invention or the scope of the appended claims.

What we claim is:

1. In a powder actuated firing device, a housing with a bore extending inwardly from its front, a breech block in said bore and secured to a barrel, means mounting said breech block and housing permitting relative axial movement therebetween in said bore, a firing pin in said housing behind said breech block and resiliently biased to move toward said breech block in the same general axial direction and to align with a firing pin hole in said breech block, said firing pin having a depressible pawl movable in a direction angularly disposed with the direction of firing pin movement, said breech block being normally disposed in a first safety position within said bore with the muzzle end of the barrel extending forwardly from the front of said housing said housing and breech block being relatively movable to locate said breech block in a second ready-to-fire position within said bore with said muzzle end of the barrel disposed adjacent the front of said housing, a movable firing trigger on said housing and operative to release said firing pin only when said breech block is in said ready-to-fire position and means on said breech block for exerting a force against said pawl in the direction opposite to firing pin cocking travel for cocking said firing pin in response to said relative movement between said housing and breech block effective to locate said breech block in said ready-to-fire position.

2. In a powder actuated firing device, a housing with a bore extending inwardly from its front, a breech block in said bore secured to a barrel, means mounting said breech block and housing permitting relative axial movement therebetween in said bore but preventing relative rotational movement, a firing pin in said housing behind said breech block and resiliently biased to move toward said breech block in the same general axial direction and to align with a firing pin hole in said breech block, said firing pin having a depressible pawl movable in a direction angularly disposed with the direction of firing pin movement, said breech block being normally disposed in a first safety position within said bore, with the muzzle end of the barrel extending forwardly from the front of said housing, said housing and breech block being relatively movable to locate said breech block in a second ready-to-fire position within said bore with said muzzle end of the barrel disposed adjacent the front of said housing, a movable firing trigger on said housing and operative to release said firing pin only when said breech block is in said second position, rod means on said breech block for exerting a force against said pawl in the direction opposite to firing pin cocking travel for cocking said firing pin in response to said relative movement between said housing and breech block effective to locate said breech block in said ready-to-fire position, means interconnecting said firing pin with said pawl in such manner as to prevent rotation of said pawl relative to said housing and thereby effective to retain said pawl in alignment with said rod.

3. In a powder actuated firing device, a housing with a bore extending inwardly from its front, a breech block in said bore secured to a barrel, means mounting said breech block and housing permitting relative axial movement therebetween in said bore but preventing relative rotational movement, a firing pin in said housing behind said breech block and resiliently biased to move toward said breech block in the same general axial direction and to align with a firing pin hole in said breech block, said firing pin having a resiliently biased depressable pawl movable in a direction angularly disposed with the direction of firing pin movement, said breech block being normally disposed in a first safety position within said bore, with the muzzle end of the barrel extending forwardly from the front of said housing, said housing and breech block being relatively movable to locate said breech block in a second ready-to-fire position within said bore with said muzzle end of the barrel disposed adjacent the front of said housing, a movable firing trigger on said housing and operative to release said firing pin only when said breech block is in said second position, rod means on said breech block for exerting a force against said pawl in the direction opposite to firing pin cocking travel for cocking said firing pin in response to said relative movement between said housing and breech block effective to locate said breech block in said ready-to-fire position, means interconnecting the firing pin and pawl for preventing rotation of said pawl relative to said housing effective to retain said pawl in alignment with said rod, and resilient means extending between the back of said breech block and housing and normally biasing said breech block toward said first safety position.

4. A powder charge actuated tool comprising a housing, a powder charge firing means, a barrel for receiving a powder charge, means mounting said barrel and said housing for endwise relative movement between a normal first safety position with the muzzle end of said barrel extending forwardly from the front end of said housing and a second ready-to-fire or firing position with the muzzle end of said barrel disposed adjacent the front end of said housing, resilient means biasing the barrel and the housing toward said first position, and barrel engageable latching means carried in said housing and having latching and unlatching positions with said barrel, means normally urging said latching means toward said latching position with said barrel for preventing relative movement of said barrel and housing fully to said second position, lock means carried in said housing and selectively movable into locked and unlocked positions with said latching means, and said lock means being engageable with said resilient means and responsive to its biasing action to move into locking position with said latching means effective to hold said latching means in said unlatching position, whereby said resilient means must be operative before said tool can be fired.

5. A powder charge actuated tool comprising a powder charge firing means, a barrel for receiving a powder charge, housing means mounting said barrel and said firing means for endwise relative movement between a first safety position and a second ready-to-fire position, resilient means biasing the barrel and said firing means toward said first position, barrel engageable latching means having latching and unlatching positions, means normally urging said latching means toward said latching position with said barrel for preventing relative movement of said barrel and firing means fully to said ready-to-fire position, lock means mounted on the barrel and selectively movable into locked and unlocked positions with said latching means, and said lock means being engageable with said resilient means and responsive to its biasing action to move into said locking position with said latching means effective to hold said latching means in said unlatching position, whereby said resilient means must be used before said tool can be fired.

6. A fastener driving powder charge actuated tool comprising a powder charge firing means, a barrel for receiving a powder charge, housing means mounting said barrel and said firing means for endwise relative movement between a first safety position with the muzzle end of said barrel extending forwardly from the front end of said housing, and a second ready-to-fire or firing position with the muzzle end of the barrel disposed adjacent the front of said housing, a flash shield telescopically mounted over said barrel and located near the barrel muzzle, resilient means biasing the barrel and the firing means toward said first position and normally urging the flash shield toward the barrel muzzle for engagement with a workpiece into which said fastener is driven, and barrel engageable latching means having latching and unlatching positions, means normally urging said latching means toward said latching position with said barrel for preventing relative movement of said barrel and firing means fully to said second position, lock means carried in said housing and selectively movable into locked and unlocked positions with said latching means, and said lock means being engageable with said resilient means and responsive to its biasing action to move into locking position with said latching means effective to hold said latching means in said unlatching position, whereby said resilient means and safety shield provided for safety must be present in said tool before said tool can be fired.

7. A powder charge actuated tool comprising a powder charge firing means, a barrel for receiving a powder charge, housing means mounting said barrel and said firing means for endwise relative movement between a normal first safety position with the muzzle end of said barrel extending forwardly from the front end of said housing, and a second ready-to-fire or firing position with said muzzle end of the barrel located adjacent the front end of said housing, resilient helical spring means telescoped over said barrel, a stop means on said barrel and engageable with one end of said spring means, a stop ring operatively connected with said housing means and engageable with the other end of said spring means, said stop ring telescoping over the barrel during said relative movement between said barrel and said firing means, said spring means being effective through said means engageable with its ends to bias said barrel and firing means toward said first position, and barrel engageable latching means carried in said housing located adjacent said stop ring and having latching and unlatching positions with said barrel, means urging said latching means toward said latching position for preventing relative movement of said barrel and firing means fully to said second position, and said stop ring being responsive to the biasing action of said spring means to exert a force against said latching means effective to keep said latching means in the unlatching position, whereby said resilient spring means provided for safety must be operative to exert said biasing action before said tool can be fired.

8. A fastener driving powder charge actuated tool comprising a powder charge firing means, a barrel for receiving a powder charge, housing means mounting said barrel and said firing means for endwise relative movement between a normal first safety position and a second ready-to-fire or firing position, a flash shield telescopically mounted over said barrel and located near the barrel muzzle, resilient helical spring means telescoped over said barrel, stop means comprising a stop disposed at the muzzle end of said barrel and engageable with one end of said spring means, said flash shield being engageable with said stop, a stop ring operatively connected with said housing means and engageable with the other end of said spring means, said spring means being effective through said stop means and stop ring engaging its ends to bias said barrel and firing means toward said first position and urge said flash shield toward the barrel muzzle for engagement with a workpiece into which a fastener is driven, said stop ring telescoping over the barrel during said relative movement between said barrel and firing means, and barrel engageable latching means operatively engageable with said stop ring and having latching and unlatching positions with said barrel, means normally urging said latching means toward said latching position for preventing relative movement of said barrel and firing means fully to said second position, and said spring means being effective by its biasing action to exert a force against said stop ring effective to hold said latching means in said unlatching position, whereby said resilient spring means provided for safety must be operative to exert said biasing action before said tool can be fired.

9. A fastener driving powder charge actuated tool comprising a powder charge firing means, a barrel for receiving a powder charge, housing means mounting said barrel and said firing means for endwise relative movement between a normal first safety position and a second ready-to-fire or firing position, a flash shield telescopically mounted over said barrel and located near the barrel muzzle, resilient helical spring means telescoped over said barrel, stop means operatively connected with said barrel and engageable with one end of said spring means, means operatively engageable with the opposite end of said spring means and operatively connected with the housing means, said spring means being effective through said means operatively engageable with its ends to bias said barrel and firing means toward said first position and urge said flash shield toward the barrel muzzle for engagement with a workpiece into which a fastener is to be driven, said means operatively engageable with the opposite end of said spring comprising latching means actuatable to latched and unlatched positions with said barrel, said latching means including gripper means and means normally urging said gripper means toward said latched position with said barrel, and gripper opening means operatively engageable with said opposite end of said spring means being responsive to said biasing action of said spring means and axially drivable thereby relative to said barrel to engage said gripper means and hold the latter in said unlatched position.

10. A powder charge actuated fastener driving tool for driving a fastener into a recessed part of a workpiece, comprising housing means, a resiliently biased firing pin carried in said housing means, a trigger on said housing means, a barrel in said housing means and having a breech for receiving a powder charge, said housing means mounting said barrel and firing pin for a predetermined magnitude of relative movement between a first safety position with the barrel breech disposed forwardly of the firing pin and a second ready-to-fire position wherein said firing pin is disposed closely adjacent said barrel breech and in position to be released by said trigger, means operatively connected with said barrel and said housing means being effective to normally bias said barrel and firing pin toward said first position, means connected with the breech and responsive to the relative movement of said barrel, housing means and firing pin from said first to second positions to cock said firing pin, a flash shield telescopically movable over said barrel adjacent the barrel muzzle and disposed for engagement with the surface of said workpiece surrounding said recessed part with the barrel and firing pin disposed in said ready-to-fire position and with said barrel extending into said recessed part and engaging the surface of said part into which a fastener is to be driven, stop means connected with said housing and said flash shield and operable to stop the telescopic movement of said flash shield over said barrel at the instant said predetermined magnitude of relative movement between said barrel, housing means and firing pin is obtained, said stop means being operable to prevent any greater magnitude of relative movement between said barrel, housing means and firing pin from being obtained and hence preventing firing of said tool in the event said tool is tilted within said recessed part, and said trigger being responsive to placing said barrel substantially perpendicularly against said surface and to the said relative movement between said barrel, said housing means and said firing pin to said second ready-to-fire position to occupy a firing pin releasing position.

11. A powder charge actuated fastener driving tool for driving a fastener into a recessed part of a workpiece, as is defined in claim 10, and wherein indicator means are operatively connected with said firing pin and visually indicate exteriorly of said housing the ready-to-fire positioning of said firing pin on relative movement between said firing pin and said housing.

12. In a tool, comprising a pistol grip handle, a tool attachment receiving bore in said handle with one open end for receiving said attachment when not in use, and locking means for detachably locking said attachment in said bore, said locking means comprising a one piece resilient spring latch frictionally secured in a recess in said pistol grip handle extending inwardly from said open end in the same direction as said bore, said latch having a mid-portion bearing against the bore side of the recess and having an attachment retainer portion one end resiliently biased over said open end but swingable away therefrom and having its other end bent back upon the mid-portion with a sharp distal end engaged in the recess side remote from said bore.

13. A powder charge actuated fastener driving tool comprising a housing means, a powder charge firing means, means operatively connecting said housing and firing means together, a barrel, means mounting said barrel and said housing means for relative movement between a normal first safety position and a second ready-to-fire or firing position, and adjustable safety locking means operatively connected to one of said housing means and said barrel and having more than two manually selectable positive operative or inoperative positions for respectively preventing or permitting travel to the ready-to-fire or firing position.

14. A powder charge actuated fastener driving tool comprising a powder charge firing means, a barrel means, means mounting said barrel and said firing means for relative movement between a normal first safety position and a second ready-to-fire position with said barrel and firing means in said respective positions spaced apart and adjacent each other, means for moving said firing means to a ready-to-fire position responsive to movement from said first to said second positions, said firing means including manual operable firing means for firing said powder only when the tool is in the ready-to-fire position, and adjustable safety locking means operatively connected to one of said first two mentioned means and having more than two manually selectable operative or inoperative positions for respectively preventnig or permitting travel to the ready-to-fire position.

15. A powder charge actuated fastener driving tool comprising a powder charge firing means, a barrel having a breech for receiving a powder charge, housing means mounting said barrel and said firing means for endwise relative movement between a first safety position with the barrel breech disposed forwardly of the firing means, and a second ready-to-fire position with said firing means being disposed closely adjacent said barrel breech, resilient means normally biasing said barrel and said firing means toward said first position, a flash shield telescopically mounted over said barrel for engaging a workpiece into which a fastener is to be driven, said firing means including manually operable trigger means operatively connected with said housing means, means connected with the breech and responsive to the relative movement of said barrel and firing means to said second position to cause said firing means to assume a cocked position, said trigger means occupying a firing means releasing position in said second position of said firing means and said barrel, and safety locking means operatively connected with said housing means and selectively actuatable into engagement with said flash shield to prevent the relative movement of said firing means and said barrel to said second position.

16. A powder charge actuated fastener driving tool comprising a housing member, a powder charge firing means in said housing member, a barrel having a breech for receiving said powder charge, means mounting said barrel and said housing member for relative endwise movement between a normal first safety position and a second ready-to-fire or firing position with said housing member moved endwise toward the barrel breech in traveling from said first to said second positions, said firing means being moved endwise between said first and second positions by pressing the barrel muzzle against the work piece in which said fastener is to be driven, a flash shield member telescopically connected on said barrel for engaging said work piece, and resilient means normaly biasing said barrel and said housing member and firing means toward said first position, safety locking means operatively connected to one of said members and having manually selectable operative or inoperative positions for respectively preventing or permitting travel to the second position by stopping the movement in said operative position as the shield member and barrel muzzle are pressed against the work piece so that movement to said second position cannot occur.

17. A powder charge actuated fastener driving tool comprising a powder charge firing means including a member, a barrel having a breech for receiving said powder charge, housing means mounting said barrel and said firing means for endwise relative movement between a normal first safety position and a second ready-to-fire position with said firing means moved endwise toward the barrel breech in traveling from said first to said second spaced apart positions, said firing means being moved endwise between said first and second positions by pressing the barrel muzzle against the work piece in which said fastener is to be driven, a flash shield member telescopically connected on said barrel for engaging said work piece, means on said barrel for preventing said flash shield from traveling away from said breech beyond a fixed position with respect to said barrel muzzle, means for moving said firing means to a ready-to-fire position responsive to movement from said first to said second positions, said firing means including manually operable firing means for firing said powder only in the ready-to-fire position, and safety locking means operatively connected to one of said members and having manually selectable operative or inoperative positions for respectively preventing or permitting travel to the ready-to-fire position by stopping the movement in said operative position as the shield member and barrel muzzle are pressed against the work piece so that movement to said ready-to-fire position cannot occur.

18. A powder charge actuated fastener driving tool comprising a housing member, a powder charge firing means, a barrel having a breech for receiving said powder charge, means mounting said barrel and said housing member for endwise relative movement between a normal first safety position and a second ready-to-fire or firing position with said firing means moved endwise toward the barrel breech in traveling from said first to said second positions, said firing means being moved endwise between said first and second positions by pressing the barrel muzzle against the work piece in which said fastener is to be driven, a flash shield member telescopically connected on said barrel for engaging said work piece, means on said barrel for preventing said flash shield from traveling away from said breech beyond a fixed position with respect to said barrel muzzle, and safety locking means operatively connected to one of said members and having manually selectable operative or inoperative positions for respectively preventing or permitting travel to the second position by stopping the movement in said operative position as the shield member and barrel muzzle are pressed against the work piece so that movement to said second position cannot occur.

19. A powder charge actuated fastener drving tool comprising a powder charge firing means including a member, a barrel having a breech for receiving said powder charge, housing means mounting said barrel and said firing means for endwise relative movement between a normal first safety position and a second ready-to-fire or firing position with said firing means moved endwise toward the barrel breech in traveling from said first to said second positions spaced apart and adjacent each other, said firing means being moved endwise between said first and second positions by pressing the barrel muzzle against the work piece in which said fastener is to be driven, a flash shield member telescopically connected on said barrel for engaging said work piece, and adjustable stop means operatively connected to one of said members and having manually selectable positions so that when in any predetermined position corresponding with the distance between barrel muzzle and flash shield work piece engagements, the barrel and flash shield will be against the work piece when the tool is in said second position.

20. A powder charge actuated fastener driving tool comprising a housing member, a powder charge firing means, a barrel having a breech for receiving said powder charge, means mounting said barrel and firing means for endwise relative movement between a normal first safety position and a second ready-to-fire or firing position with said firing means moved endwise toward the barrel breech in traveling from said first to said second positions, said firing means being moved endwise between said first and second positions by pressing the barrel muzzle against the work piece in which said fastener is to be driven, a flash shield member telescopically connected on said barrel for engaging said work piece, resilient means normally biasing said barrel toward said first position, and adjustable stop means operatively connected to one of said members and having manually selectable positions so that when in any predetermined position corresponding with the distance between barrel muzzle and flash shield member work piece engagements, the barrel and flash shield member will be against the work piece when the tool is in said second position, said shield member and barrel muzzle and the position of said stop means being so located that when the shield member and the stop means are engaged and when the shield member and muzzle are pressed against the work piece, the bore of said barrel must be approximately perpendicular to the work piece to move the tool into the ready-to-fire position.

21. A powder charge actuated tool comprising a powder charge firing means, a barrel for receiving a powder charge in its breech, means mounting said barrel and said firing means for relative movement between a normal first safety position and a second ready-to-fire or firing position with said barrel and firing means in said respective positions spaced apart and adjacent each other, a breech block covering said breech and detachably connected to said barrel by screw threads with an axis extending in the same general direction as the barrel bore, and breech lock means for locking said breech block against detachment from said barrel during firing said powder charge comprising a lock pin operatively engageable with said breech block and barrel and movable in the direction of the barrel axis for locking said breech block by blocking the unscrewing of said threads.

22. A powder charge actuated tool comprising a powder charge firing means, a barrel for receiving a powder charge in its breech, housing means mounting said barrel and said firing means for endwise relative movement between a normal first safety position and a second ready-to-fire or firing position with said barrel and firing means in said respective positions spaced apart and adjacent each other, said barrel and said firing means being biased toward said first position so that force must be applied to move to the second position, a breech block covering said breech and detachably connected to said barrel, and breech lock means responsive to movement approaching said second position for locking said breech block against detachment from said barrel during firing said powder charge and responsive to movement away from said second position for unlocking, said breech lock means comprising a lock pin and a lost motion connection between said barrel and lock pin for permitting movement of said barrel from ready-to-fire position to said safety position.

23. A powder charge actuated tool comprising a housing, a powder charge firing means, a barrel telescopically mounted in said housing for receiving said powder charge in its breech, said barrel and said firing means being mounted in said housing for endwise relative movement between a normal first safety position and a second ready-to-fire or firing position, said barrel and said firing means being biased toward said first position, said barrel having an elongated slot and cooperating guide means on said housing for guiding in endwise movement between said positions, said slot having a widened portion for cooperation with said guide means when the barrel is in said second position so as to prevent turn jamming the barrel against the side of the slot in the second position so that movement will not occur under said bias toward the first position when any force urging it to the second position is removed.

24. A powder charge actuated tool comprising a housing, a powder charge firing means, a barrel telescopically mounted in said housing for receiving said powder charge in its breech, said barrel and said firing means being mounted in said housing for endwise relative movement between a normal first safety position and a second ready-to-fire position with said barrel and firing means in said respective positions spaced apart and adjacent each other, said barrel and said firing means being biased toward said first position, said barrel having an elongated slot and cooperating guide means on said housing for guiding in endwise movement between said positions, said slot having a widened portion for cooperation with said guide means when the barrel is in said ready-to-fire position so as to prevent turn jamming the barrel against the side of the slot in the ready-to-fire position so that movement will not occur under said bias toward the first position when any force urging it to the second position is removed, and means for moving said firing means to a ready-to-fire position responsive to movement from said first to said second positions, said firing means including manual operable firing means for firing said powder when the tool is in the ready-to-fire position.

25. A powder charge actuated tool comprising a barrel housing, a powder charge firing means, a barrel telescopically mounted in said housing with said barrel receiving said powder charge in its breech, means mounting said barrel and said housing for endwise relative movement between a normal first safety position and a second ready-to-fire position, said barrel and said housing being biased toward said first position, a breech closure member covering said breech and means for detachably connecting it thereto, said barrel having an elongated slot therein, an extension rod tube positioned under said housing and supported at the muzzle end of said housing by a tube end receiving bracket thereon, a hinge means connecting said housing and breech closure member, a second tube end receiving bracket means for the tube end adjacent said hinge means, and a single screw connecting together the housing end of said hinge means, said second tube end receiving bracket means, and the housing with the end of said screw projecting into the elongated barrel slot.

26. A powder charge actuated tool comprising a barrel housing, a powder charge firing means, a barrel telescopically mounted in said housing for receiving said powder charge in its breech, said barrel and said firing means being mounted in said housing for endwise relative movement between a normal first safety position and a second ready-to-fire or firing position with said barrel and firing means in said respective positions spaced apart and adjacent each other, said barrel and said firing means being biased toward said first position, a breech block covering said breech and detachably connected to said barrel by screw threads, said barrel having an elongated slot and cooperating guide means on said housing to prevent unscrewing said barrel from said breech block and to guide said barrel during endwise movement between said positions, said slot having a widened portion for cooperation with said guide means during approach to and in said second position so as to prevent turn jamming the barrel in the second position so that movement will occur under said bias toward the first position when any force urging it to the second position is removed, and breech lock means on said housing responsive to movement approaching said second position for locking said breech block against detachment from said barrel during firing said powder, said breech lock means being effective when said guide means reaches the widest part of said elongated slot.

27. A powder charge actuated tool comprising a powder charge firing means, a barrel having a breech for receiving a powder charge therein, housing means mounting said barrel and said firing means for endwise relative movement between a first safety position with the barrel breech disposed forwardly of the firing means, and a second ready-to-fire or firing position with said firing means disposed closely adjacent said barrel breech, a breech block in said housing means covering said breech and detachably connected to said barrel by screw threads, and means interconnecting said housing means, breech block and barrel for releasably locking said breech block to said barrel during firing said powder charge when the breech block and barrel are fully screwed together, and said last named means being operative to permit the relative movement of said barrel and said firing means to said second position when said breech block and barrel are completely connecting each other.

28. A powder charge actuated tool comprising a tool housing having two portions, a powder charge firing means, a barrel telescopically mounted in but non-rotatable relative to the first portion of said housing with said barrel receiving said powder charge in its breech, said barrel and said firing means being mounted in said housing for endwise relative movement between a normal first safety position and a second ready-to-fire or firing position with said barrel and firing means in said respective positions spaced apart and adjacent each other, a breech block telescopic in but non-rotatable relative to the second portion of said housing, said breech block covering said breech and detachably connected to said barrel by screw threads, interlock means on said housing responsive to movement approaching said second position for locking said breech block against detachment from said barrel during firing said powder, said breech lock means comprising an interlock pin carried by one of said housing portions movable in the direction of the barrel axis for locking said breech block by entering a cutout in the second of said housing portions when fully screwed together for blocking the unscrewing of said threads, and comprising movement transmitting means between said barrel and pin, the second of said housing portions having a shoulder adjacent said cutout blocking the travel of said pin if said barrel and breech block are not fully screwed together so that the barrel cannot be moved to the second position.

29. A tool, as set forth in claim 28, wherein said housing portions have bayonet means for connecting said portions simultaneously with said screw threads, said bayonet means on each housing portion including a plurality of radially directed and arcuately spaced radially extending lugs, said interlock pin slidable into the cutout between the arcuate spacing of adjacent lugs on both housing portions.

30. A tool, as set forth in claim 28, wherein said housing portions have bayonet means for connecting said portions simultaneously with screw threads, said bayonet means including an overlatching pin carried by one of said housing portions cooperable with a clearance flat leading to a locking groove on the other of said housing portions.

31. A powder actuated tool, comprising a barrel assembly including a barrel member having a chamber in its breech, a breech assembly including an interconnected breech block and firing means, said breech block having a telescopic connection with said barrel member breech and having a screw thread connection therebetween, and connecting means between said barrel assembly and breech assembly comprising a pivot hinge having an elongated slot for the telescopic action and comprising a rotatable connection between one-half of said hinge and one of said assemblies for the screw action, said assemblies being either screwed together for firing or pivoted open for loading.

32. A powder actuated tool, comprising a barrel member having a chamber in its breech, a breech assembly including an interconnected breech block, and a full pistol grip extending outwardly from the bore axis of said barrel member, said breech block having a telescopic connection with said barrel member breech and having a screw thread connection therebetween, connecting means between said barrel member and breech assembly for pivotal, axial and rotative relative movement, and a deflector pad shield mounted on the muzzle of said barrel member for engagement with the surface into which the fastener is to be driven, said shield having its surface engagement portion located a sufficient distance from said barrel axis and all the parts of said tools being arranged so that if said surface is approximately horizontal, said tool will remain upright when said members are either screwed together for firing or pivoted open for loading.

33. A powder actuated tool, comprising a barrel member having a breech formed with a chamber, a barrel collar connected with said barrel member adjacent said breech, a detachable breech plug insertable into said chamber, said plug having a bore therethrough for receiving a cartridge case for driving a fastener through said barrel member, a breech assembly including a breech block member detachably interconnected to said barrel member and a full pistol grip extending outwardly from the bore axis of said plug, a hinge pivotally interconnecting said barrel collar and said breech assembly and having connecting means to permit a relative telescopic movement of said barrel member and said breech block member, a screw thread connection between said barrel member and said breech block member, said hinge permitting a pivotal movement of said breech assembly relative to said barrel member, said connecting means on said hinge also permitting a relative rotatable movement between said barrel member and said breech block member, said breech assembly and said barrel member being selectively disposed between a cartridge case loading position and a tool assembled and loaded position in response to said relative pivotal, telescopic and rotatable movements, a deflector pad shield mounted on the muzzle end of said barrel member for engagement with a surface into which a fastener is to be driven, said shield having its peripheral edge disposed for engagement with said surface at a predetermined lateral distance from the barrel member axis, and said hinge and connecting means when the tool is disposed in a vertical upright position and the barrel member and said breech assembly are disposed in said cartridge case loading position, thus locating the resultant center of gravity of said barrel member and breech assembly within the boundary of the peripheral edge of said deflector pad shield.

34. An explosive tool comprising a barrel, a firing pin, a housing assembly including a mounting for said firing pin, means mounting said housing assembly for manual axial movement relative to said barrel, means normally biasing the firing pin toward the breech end of the barrel, means connecting said barrel and said housing assembly including a pivot pin transversely of the longitudinal axis of the barrel for pivoting said housing assembly for movement away from said barrel for loading said barrel with a fastener unit and toward said barrel to a closed firing position, means on said barrel and said housing assembly for interlocking said barrel and said housing assembly in firing position, means for supporting a breech block in said housing assembly, means carried by said breech block for engaging and cocking said firing pin against its resilient bias as said housing assembly is manually moved axially of said barrel, and means including a pivoted member carried by said housing for releasing said firing pin.

35. A fastener driving powder charge actuated tool comprising a powder charge firing means, a barrel for receiving a powder charge, housing means mounting said barrel and said firing means for endwise relative movement between a normal first safety position and a second ready-to-fire or firing position, a flash shield telescopically mounted over said barrel and located near the barrel muzzle, said flash shield having tube means disposed radially outwardly of said barrel and defining an annular cavity therebetween, said cavity being closed at its forward end adjacent said barrel muzzle, resilient helical spring means telescoped over said barrel, stop means comprising a stop disposed at the muzzle end of said barrel and engageable with one end of said spring means, said flash shield being engageable with said stop, a stop ring operatively connected with said housing means and engageable with the other end of said spring means, said spring means being effective through said stop means and stop ring engaging its ends to bias said barrel and firing means toward said first position and urge said flash shield toward the barrel muzzle for engagement with a workpiece into which a fastener is driven, said stop ring telescoping over the barrel during said relative movement between said barrel and firing means, barrel engageable latching means operatively engageable with said stop ring and having latching and unlatching positions with said barrel, means normally urging said latching means toward said latching position for preventing relative movement of said barrel and firing means fully to said second position, said spring means being effective by its biasing action to exert a force against said stop ring effective to hold said latching means in said unlatching position, whereby said resilient spring means provided for safety must be operative to exert said biasing action before said tool can be fired, and port means formed in said barrel and communicating with said annular cavity, said port means being operable upon the firing of said powder charge to vent the explosive gases thereof into said cavity wherein said gases create a component of force acting upon the closed end of said cavity effective to press said flash shield into increased pressure engagement with said workpiece.

36. A powder actuated tool for driving a fastener into the surface of a workpiece comprising a barrel with a fastener driving bore with means for receiving and firing a fastener propelling powder charge and with a muzzle from which said fastener is propelled, housing means mounting said barrel for relative endwise movement of said housing means including a front housing tube spaced radially from said barrel and open at its front end, a flash shield extending laterally and engageable at least peripherally with said workpiece surface outwardly about said barrel, means for mounting said shield opposite said open end over said barrel near the muzzel for relative telescoping movement with respect to said barrel, said barrel having a plurality of longitudinally and annularly distributed gas exhaust ports intermediate its ends and disposed nearer said muzzle, said shield mounting means including tube means extending rearwardly from said shield into said open end and disposed inwardly of said housing tube in telescoping relationship therewith and radially outwardly of said barrel to define an annular blast chute outwardly of said tube means and open at the front end and a gas release chamber surrounding the barrel in communication with said ports, said chamber having a front end orificed for passing the barrel and being substantially closed at its front end adjacent said muzzle and shield and open at its rear end in communication with said blast chute, means for biasing said shield forwardly toward said muzzle, a laterally extending stop disposed forwardly of said shield and mounted on said muzzle for coacting with said shield and tube means so as to constrain said biased shield against unlimited forward movement ahead of said muzzle and to constrain said tube means and the included forwardly closed chamber into disposition at all time opposite said ports even when said housing and its tube is at the limit of said endwise movement rearwardly of said barrel, whereby upon firing of said charge and substantial driving of said fastener at said muzzle into said workpiece surface, the residual gases in said bore rearwardly of said fastener are evacuated from said bore through said ports into said chamber and from its open end into said blast chute to create components of forces acting upon the closed end of said chamber and the shield opposite said open end of said chute to thrust both said shield and muzzle into increased pressure engagement with said workpiece surface in counteraction against the opposing force of recoil encountered.

37. The tool of claim 36 including a barrel extension having means at the rear end thereof making said extension detachably mountable on the muzzle of the barrel upon removal of the stop means therefrom and having when so mounted a fastener driving bore aligned with the barrel bore for increasing the effective length of the barrel for extending operatively into a deeply recessed portion of the workpiece surface, means at the front end of the extension for detachably remounting said stop there, and wherein the shield mounting tube means is not only in telescoping relationship but also of sufficient length, when constrained by said remounted stop, to remain in telescoped overlapping relationship with the open front end of the front housing tube, whereby both said annular blast chute and gas release chamber formed by said tubes constitute a telescopically extendable exhaust chamber about the barrel adjacent its exhaust ports, said housing tube being endwise movable relative to the extended barrel assembly between a first position with said housing tube spaced farther from said stop and a second position with said tube spaced closer to said stop, and wherein the shield is engageable substantially all around the barrel axis with a portion of the workpiece surface at any preselected position between said stop and housing tube, there being mounted on said housing means a firing means, means operatively connected to the barrel and responsive to movement from said first to said second positions for changing said firing means from a safety to a read-to-fire condition, and adjustable abutment means selectively interposable between said housing tube and shield in correspondence with the selected position of said shield for stopping the housing tube by abutment with said shield from further movement past said selected position, whereby if both said shield and stop are not engaged with said surface and said barrel axis is tilted from the perpendicular with respect to the shield engaging portion of said surface in excess of a predetermined amount, movement to said second position is prevented.

38. The tool of claim 27 wherein said screw threads are a series of axially extending mating female and male thread segments evenly distributed and regularly interrupted circumferentially about said breech block and barrel and so constructed that first an axial engagement and then a turn for a fraction of a whole turn corresponding to said segments and interruptions are needed before said block and barrel are fully engaged axially.

39. The tool of claim 6 wherein the lock means comprises an axially movable stop ring mounted on said barrel and having a conical tapered male surface, and wherein the latching means comprises a series of separate movable arcuate barrel gripper segments arranged circumferentially complementary to said ring about said barrel and having female tapered surfaces mating with that of said ring, said segments being urged radially inwardly into barrel gripping relationship, said ring surface being biased against said segment surfaces by said resilient means to wedge said gripper segments out of said relationship.

40. The tool of claim 31 wherein the connecting means includes a barrel housing assembly, a pivot pin mounted on said assembly transversely of the longitudinal axis of the barrel for pivoting said breech assembly for movement transversely of said barrel housing assembly, and a ring rotatably carrying said breech assembly with limited arcuate oscillation sufficient for locking and unlocking the breech screw thread connection, said ring including a longitudinally slotted hinge means coacting pivotally with and receiving said pin for pivoting said breech assembly with respect to said barrel assembly, whereby when said breech assembly is rotated in said ring to unlock said thread said breech assembly including the pistol grip is put out of an axial plane transverse to said pin and is put into another axial plane whereat the breech assembly is telescopicable axially rearwardly with respect to said pin sufficiently to completely detach the breech block and barrel member breech, whereupon the rotated breech assembly is pivotally movable about said pin at said ring for positioning into a lane of rest out of alignment with said axis for lying closely alongside said barrel assembly above the shield with one center of gravity of said breech assembly disposed low and least displaced from the barrel axis for the optimum upright stability of the tool.

References Cited in the file of this patent

UNITED STATES PATENTS

| | | |
|---|---|---|
| 267,060 | Buell | Nov. 7, 1882 |
| 939,079 | Peck | Nov. 2, 1909 |
| 1,337,444 | Douglas | Apr. 20, 1920 |
| 1,519,806 | Wesson | Dec. 16, 1924 |
| 2,306,083 | Rioux | Dec. 22, 1942 |
| 2,395,354 | Temple | Feb. 19, 1946 |
| 2,504,311 | Dunn | Apr. 18, 1950 |
| 2,518,395 | Sopris | Aug. 8, 1950 |
| 2,533,851 | Temple | Dec. 12, 1950 |
| 2,576,473 | Meyers | Nov. 27, 1951 |
| 2,594,275 | Baisch | Apr. 29, 1952 |
| 2,622,243 | Temple | Dec. 23, 1952 |
| 2,645,772 | Walker | July 21, 1953 |
| 2,648,840 | Fansworth | Aug. 18, 1953 |
| 2,659,994 | Yale | Nov. 24, 1953 |
| 2,660,726 | Weingart | Dec. 1, 1953 |
| 2,679,645 | Erickson | June 1, 1954 |
| 2,701,931 | Polny | Feb. 15, 1955 |
| 2,775,762 | Hilti | Jan. 1, 1957 |
| 2,835,894 | Behrend | May 27, 1958 |